(12) United States Patent
Pursifull et al.

(10) Patent No.: US 8,312,765 B2
(45) Date of Patent: Nov. 20, 2012

(54) FUEL VAPOR PURGING DIAGNOSTICS

(75) Inventors: Ross Dykstra Pursifull, Dearborn, MI (US); Allan J. Lippa, Northville, MI (US); John D. Russell, Portland, OR (US); Gopichandra Surnilla, West Bloomfield, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 929 days.

(21) Appl. No.: 12/399,213

(22) Filed: Mar. 6, 2009

(65) Prior Publication Data

US 2010/0223984 A1    Sep. 9, 2010

(51) Int. Cl.
*G01M 15/04* (2006.01)

(52) U.S. Cl. .................................... 73/114.39

(58) Field of Classification Search ............. 73/114.38, 73/114.39, 114.42, 114.43
See application file for complete search history.

(56) References Cited

U.S. PATENT DOCUMENTS

| | | | |
|---|---|---|---|
| 5,005,550 A | | 4/1991 | Bugin, Jr. et al. |
| 5,408,866 A | | 4/1995 | Kawamura et al. |
| 5,726,354 A | * | 3/1998 | Nomura et al. ............ 73/114.39 |
| 6,119,512 A | * | 9/2000 | Duty et al. ................. 73/114.39 |
| 6,257,209 B1 | | 7/2001 | Hyodo et al. |
| 6,523,398 B1 | * | 2/2003 | Hanai et al. ................ 73/114.39 |
| 6,637,416 B2 | | 10/2003 | Wakahara |
| 6,688,104 B2 | | 2/2004 | Baeuerle et al. |
| 6,712,049 B2 | | 3/2004 | Kawano |
| 6,804,995 B2 | | 10/2004 | Kawano |
| 6,910,467 B2 | | 6/2005 | Murakami et al. |
| 6,968,732 B2 | | 11/2005 | Nakoji |
| 7,036,359 B2 | * | 5/2006 | Hayakawa et al. ........ 73/114.39 |
| 7,272,488 B2 | * | 9/2007 | Hayashi et al. ............. 701/114 |
| 7,316,223 B2 | | 1/2008 | Wakahara |
| 7,367,326 B2 | | 5/2008 | Shikama et al. |
| 7,743,752 B2 | * | 6/2010 | Kerns et al. ................ 123/520 |
| 8,033,271 B2 | * | 10/2011 | Yoshimura ................. 123/520 |
| 2003/0221417 A1 | * | 12/2003 | Surnilla ....................... 60/284 |
| 2005/0262932 A1 | * | 12/2005 | Hayashi et al. ............ 73/118.1 |
| 2006/0137437 A1 | * | 6/2006 | Tsuyuki et al. ............ 73/118.1 |
| 2007/0113633 A1 | * | 5/2007 | Kimura ..................... 73/118.1 |
| 2010/0224171 A1 | | 9/2010 | Peters et al. |

OTHER PUBLICATIONS

Peters, Mark W, et al., "Fuel Vapor Purging Diagnostics", U.S. Appl. No. 12/900,382, filed Oct. 7, 2010, FGT083190U02CON, 75 Pgs.

* cited by examiner

*Primary Examiner* — Eric S McCall
(74) *Attorney, Agent, or Firm* — Julia Voutyras; Alleman Hall McCoy Russell & Tuttle LLP

(57) ABSTRACT

Systems and methods are provided for monitoring reverse flow of fuel vapors and/or air through a vehicle fuel vapor recovery system, the fuel vapor recovery system coupled to an engine intake of a boosted internal combustion engine. One example method comprises, intermittently adjusting a restriction in the fuel vapor recovery system during boosted conditions, and indicating degradation based on one or more of a change in a pressure value, or based on a change in flow in the fuel vapor recovery system.

21 Claims, 16 Drawing Sheets

FUEL VAPOR PURGING DIAGNOSTICS

FIELD

The present description relates to methods and systems for monitoring flow and diagnosing flow errors in a fuel vapor recovery system for a vehicle with a boosted internal combustion engine.

BACKGROUND/SUMMARY

Vehicles may be fitted with evaporative emission control systems such as onboard refueling vapor recovery (ORVR) systems. Such systems capture and reduce release of vaporized hydrocarbons to the atmosphere, for example fuel vapors released from a vehicle gasoline tank during refueling. Specifically, the vaporized hydrocarbons (HCs) are stored in a fuel vapor canister packed with an adsorbent which adsorbs and stores the vapors. At a later time, when the engine is in operation, the evaporative emission control system allows the vapors to be purged into the engine intake manifold for use as fuel.

Various approaches have been developed for detecting fuel vapor leaks in such ORVR systems. However, the inventors have recognized several potential issues with such methods. The inventors have recognized that it is possible for a reverse flow of air and/or fuel vapors through the ORVR system (for example, from the intake manifold to the fuel tank) to occur. Specifically, such reverse flows may occur in the case where a canister check valve is stuck open and/or a canister purge valve is stuck open. Likewise, it is also possible for the canister purge valve and/or check valve to degrade in boosted engines wherein the intake manifold pressure (MAP) is substantially above atmospheric pressure levels. Consequently, the purge flow may overcome a pressure relief valve (such as a pressure relief valve in the fuel tank cap), causing the fuel tank and the fuel vapor canister to over-inflate and exceed design limits of pressure. Furthermore, the reverse flow of fuel vapors through the canister purge system may cause hydrocarbon vapors to escape into the atmosphere and degrade emissions quality.

Thus, in one example, some of the above issues may be addressed by a method of monitoring reverse flow of fuel vapors and/or air through a vehicle fuel vapor recovery system, said fuel vapor recovery system coupled to an engine intake of a boosted internal combustion engine. In one example, the method comprises, intermittently adjusting a restriction in the fuel vapor recovery system during boosted conditions, and indicating degradation based on one or more of a change in a pressure value, or based on a change in flow in the fuel vapor recovery system.

In this way, by sensing changes in fluid pressure and/or fluid flow in a fuel vapor recovery system, for example fluid pressure and/or fluid flow changes across a component of the fuel vapor recovery system (such as a fuel tank pressure sensor), improper flow through a fuel vapor recovery system coupled to a boosted engine system may be identified. By identifying improper flow of air through the fuel vapor recovery system, for example, reverse flow of boosted air from an engine intake manifold, degradation of the fuel vapor recovery system may be reduced. By promptly disabling boost responsive to the reverse flow, damage to fuel vapor system components, such as valves, canisters, and/or fuel tanks, may be reduced. Additionally, reverse flow induced excessive evaporative emissions may also be addressed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
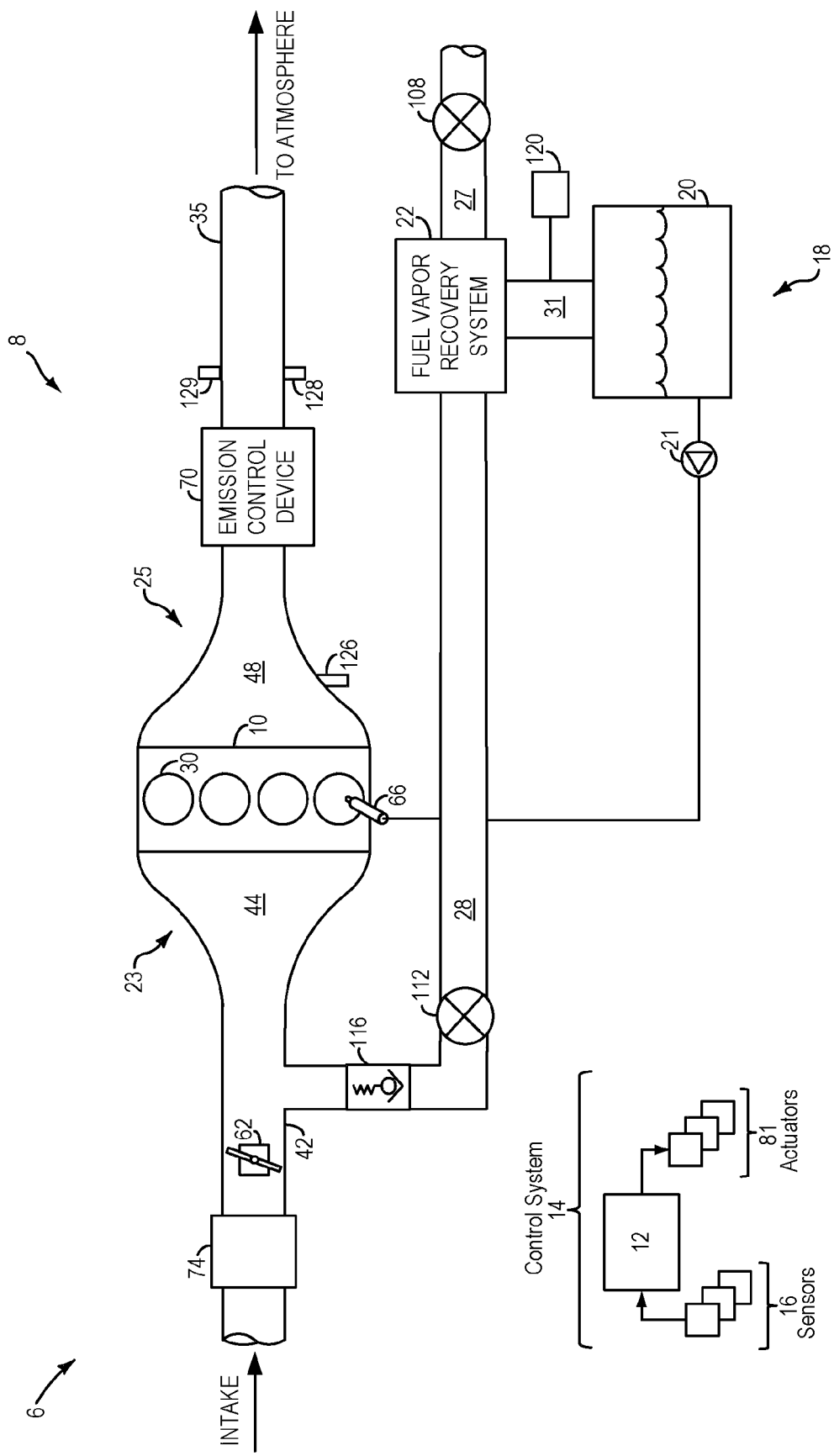
FIG. 1 shows a schematic depiction of an engine and an associated fuel vapor recovery system.

The following description relates to systems and methods for monitoring air flow and pressure changes in the fuel vapor recovery system of a vehicle with a boosted combustion engine, such as depicted in FIG. 1, to thereby reduce over-pressure related component degradation. As shown in FIGS. 2-6 and 17, a fuel tank pressure transducer may be configured to detect improper flow of air and/or fuel vapors through the fuel vapor recovery system, while complementing its role in engine-off natural vacuum leak detection. As such, if left undetected, such reverse flows may lead to system component over-pressure, component degradation, and/or excessive evaporative emissions. An engine controller may be configured to perform diagnostic routines, such as those depicted in FIGS. 7-12 and 15-16, to identify reverse flow through the fuel vapor recovery system and/or further identify the nature of component degradation. Such diagnostic routines may identify reverse flow based on characteristic changes in a pressure value, such as a fuel tank pressure and/or a manifold air pressure, or based on a change in flow. By identifying reverse flow and/or over-pressure related conditions, over-pressure related component degradation in a fuel vapor recovery system may be reduced. By enabling fuel vapor recovery and purging to proceed as described herein, degradation of emissions quality due to excess evaporative release of fuel vapor hydrocarbons can also be reduced.

FIG. 1 shows a schematic depiction of a vehicle system 6. The vehicle system 6 includes an engine system 8 coupled to a fuel vapor recovery system 22 and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors, as further elaborated in the example embodiments of FIGS. 2-6.

The engine intake 23 may further include a boosting device, such as a compressor 74. Compressor 74 may be configured to draw in intake air at atmospheric air pressure and boost it to a higher pressure. As such, the boosting device may be a compressor of a turbocharger, where the boosted air is introduced pre-throttle, or the compressor of a super-charger, where the throttle is positioned before the boosting device. Using the boosted intake air, a boosted engine operation may be performed.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Vapors generated in fuel system 18 may be routed to a fuel vapor recovery system 22, described further below, via conduit 31, before being purged to the engine intake 23. Conduit 31 may optionally include a fuel tank isolation valve. Among other functions, fuel tank isolation valve may allow a fuel vapor canister of the fuel vapor recovery system to be maintained at a low pressure or vacuum without increasing the fuel evaporation rate from the tank (which would otherwise occur if the fuel tank pressure were lowered). The fuel tank 20 may hold a plurality of fuel blends, including fuel with a range of alcohol concentrations, such as various gasoline-ethanol blends, including E10, E85, gasoline, etc., and combinations thereof. A fuel tank pressure transducer (FTPT) 120, or fuel tank pressure sensor, may be included between the fuel tank 20 and fuel vapor recovery system 22, to provide an estimate of a fuel tank pressure, and for engine-off leak detection. The fuel tank pressure transducer may alternately be located in conduit 31, purge line 28, vent 27, or fuel vapor recovery system 22, without affecting its engine-off leak detection ability.

Fuel vapor recovery system 22 may include one or more fuel vapor recovery devices, such as one or more fuel vapor canisters filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Fuel vapor recovery system 22 may further include a vent 27 which may route gases out of the recovery system 22 to the atmosphere when storing, or trapping, fuel vapors from fuel system 18. Vent 27 may also allow fresh air to be drawn into fuel vapor recovery system 22 when purging stored fuel vapors from fuel system 18 to engine intake 23 via purge line 28 and purge valve 112. A canister check valve 116 may also be included in purge line 28 to prevent (boosted) intake manifold pressure from flowing gases into the purge line in the reverse direction. While this example shows vent 27 communicating with fresh, unheated air, various modifications may also be used. Flow of air and vapors between fuel vapor recovery system 22 and the atmosphere may be regulated by the operation of a canister vent solenoid (not shown), coupled to canister vent valve 108. A detailed system configuration of fuel vapor recovery system 22 is described herein below with regard to FIGS. 2-6, including various additional components that may be included in the intake, exhaust, and fuel system.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as pressure, temperature, air/fuel ratio, and composition sensors may be coupled to various locations in the vehicle system 6, as discussed in more detail herein. As another example, the actuators may include fuel injector 66, valve 29, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 7-12, and 15-16.

Fuel vapor recovery system 22 operates to store vaporized hydrocarbons (HCs) from fuel system 18. Under some operating conditions, such as during refueling, fuel vapors present in the fuel tank may be displaced when liquid is added to the tank. The displaced air and/or fuel vapors may be routed from the fuel tank 20 to the fuel vapor recovery system 22, and then to the atmosphere through vent 27. In this way, an increased amount of vaporized HCs may be stored in fuel vapor recovery system 22. During a later engine operation, the stored vapors may be released back into the incoming air charge using the intake manifold vacuum. Specifically, the fuel vapor recovery system 22 may draw fresh air through vent 27 and purge stored HCs into the engine intake for combustion in the engine. Such purging operation may occur during selected engine operating conditions as described herein.

FIGS. 2-6 depict alternate embodiments of fuel vapor recovery system 22. It will be appreciated that like numbered components introduced in one embodiment may be referenced similarly in other embodiments and may not be reintroduced for reasons of brevity.

Figure 2:
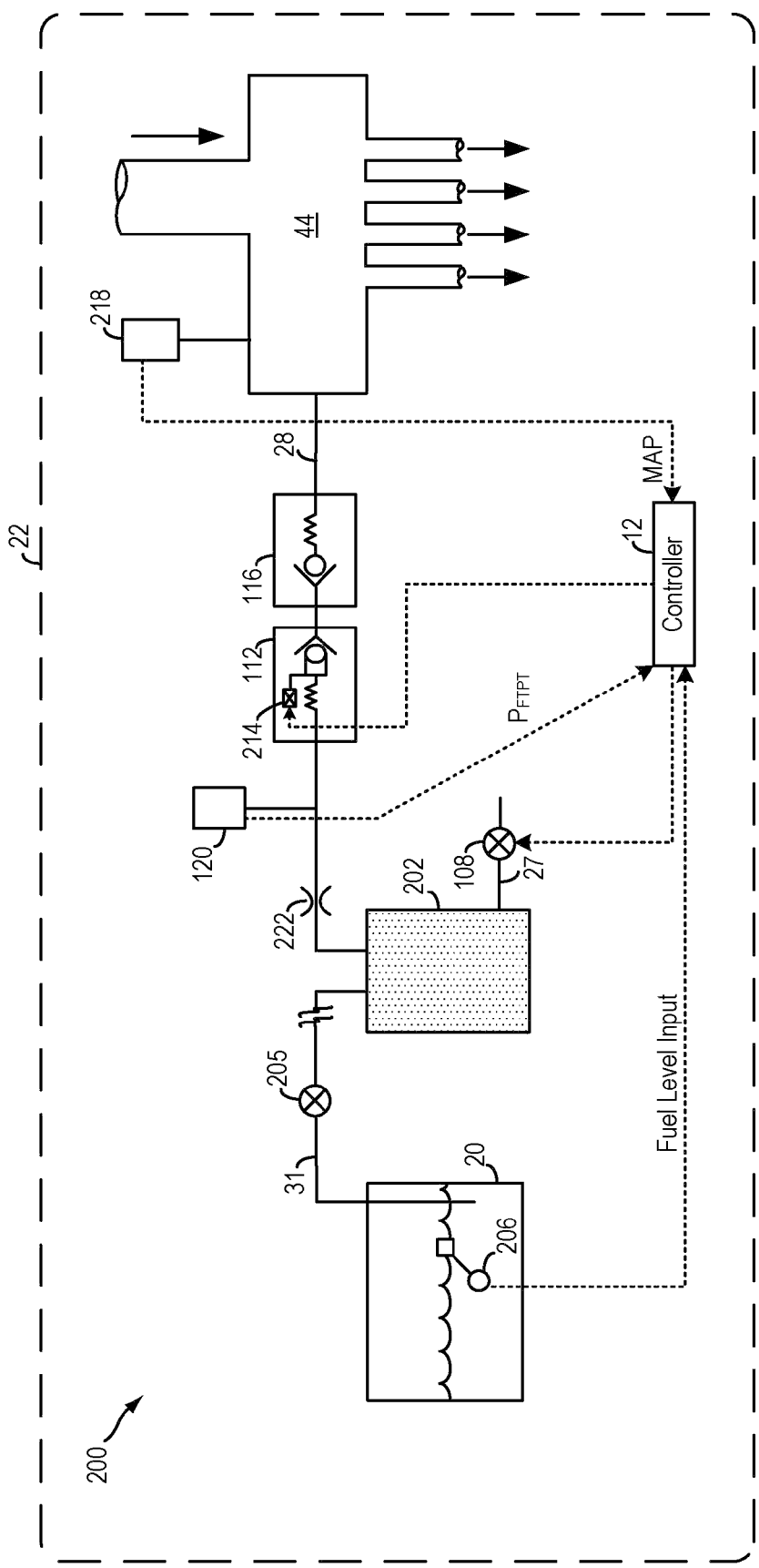
FIGS. 2-6, and 17 show alternate embodiments of the fuel vapor recovery system of FIG. 1.

FIG. 2 shows an example embodiment 200 of fuel vapor recovery system 22. Fuel vapor recovery system 22 may include one or more fuel vapor retaining devices, such as one or more of a fuel vapor canister 202. Canister 202 may be filled with an adsorbent capable of binding large quantities of vaporized HCs. In one example, the adsorbent used is activated charcoal. Canister 202 may receive fuel vapors from fuel tank 20 through conduit 31. While the depicted example shows a single canister, it will be appreciated that in alternate embodiments, a plurality of such canisters may be connected together.

A fuel level sensor 206 (also known as a "fuel sender"), located in fuel tank 20, may provide an indication of the fuel level ("Fuel Level Input") to controller 12. As depicted, fuel level sensor 206 may comprise a float connected to a variable resistor. Alternatively, other types of fuel level sensors may be used. In one example, fuel tank 20 may further include an optional pressure relief valve. However, in alternate embodiments, the fuel tank pressure relief valve may be functionally integrated into the canister vent solenoid so that tank vapors may not be directly vented to the atmosphere with passing over the adsorbant.

Further, a tank isolation valve 205 may optionally be placed in conduit 31 to temporarily prevent fuel vapor pressure from transmitting itself to the rest of fuel vapor control system. In one example, the tank isolation valve may be mounted on the fuel tank. In another example, as depicted herein, the tank isolation valve may be coupled to the fuel tank along conduit 31. As such, optional tank isolation valve 205 may prevent vapor flow to fuel vapor canister 202, thereby reducing evaporation of fuel in the tank. Thus, in the absence of tank isolation valve 205, fuel tank 20 may be exposed to low intake manifold pressures that can accelerate vapor generation. Additionally, canister purging may be most effective with the tank isolated from the canister.

Fuel vapor recovery system 22 may communicate with the atmosphere through vent 27. Canister vent valve 108 may be located along vent 27, coupled between the fuel vapor canister and the atmosphere, and may adjust flow of air and vapors between fuel vapor recovery system 22 and the atmosphere. Operation of the canister vent valve 108 may be regulated by a canister vent solenoid (not shown). Based on whether the fuel vapor recovery system is to be sealed or not sealed from the atmosphere, the canister vent valve may be closed or opened. Specifically, controller 12 may energize the canister vent solenoid to close canister vent valve 108 and seal the system from the atmosphere. In contrast, when the canister vent solenoid is at rest, the canister vent valve 108 may be opened and the system may be open to the atmosphere. Further still, controller 12 may be configured to adjust the duty cycle of the canister vent solenoid to thereby adjust the pressure at which the canister vent valve is relieved. In one example, during a fuel vapor storing operation (for example, during a fuel tank refilling and while the engine is not running), the canister vent solenoid may be de-energized and the canister vent valve may be opened so that air, stripped of fuel vapor after having passed through the canister, can be pushed out to the atmosphere. In another example, during a purging operation (for example, during a canister regeneration and while the engine is running), the canister vent solenoid may be de-energized and the canister vent valve may be opened to allow a flow of fresh air to strip the stored vapors of the activated charcoal.

Figure 8:
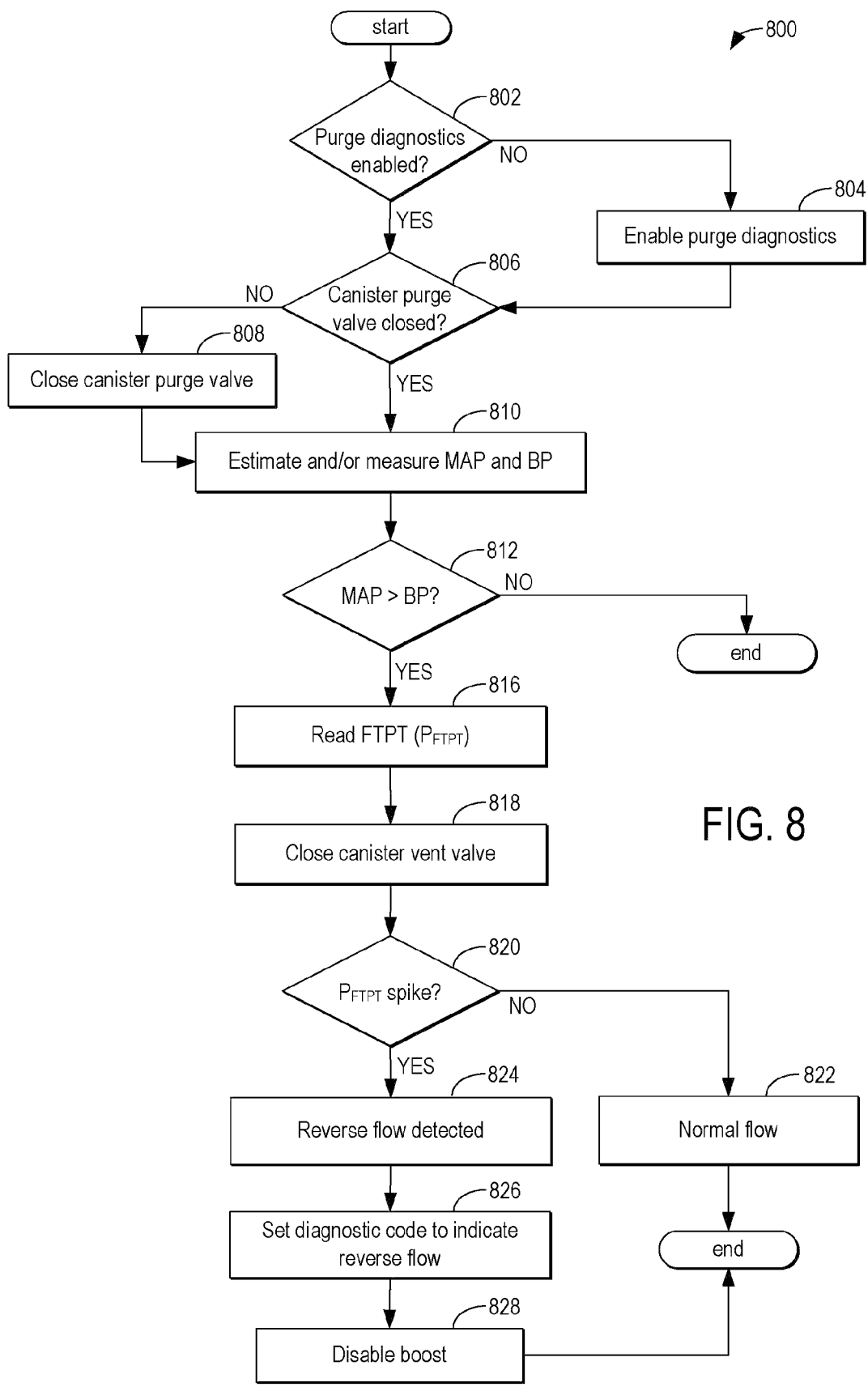
Figure 9:
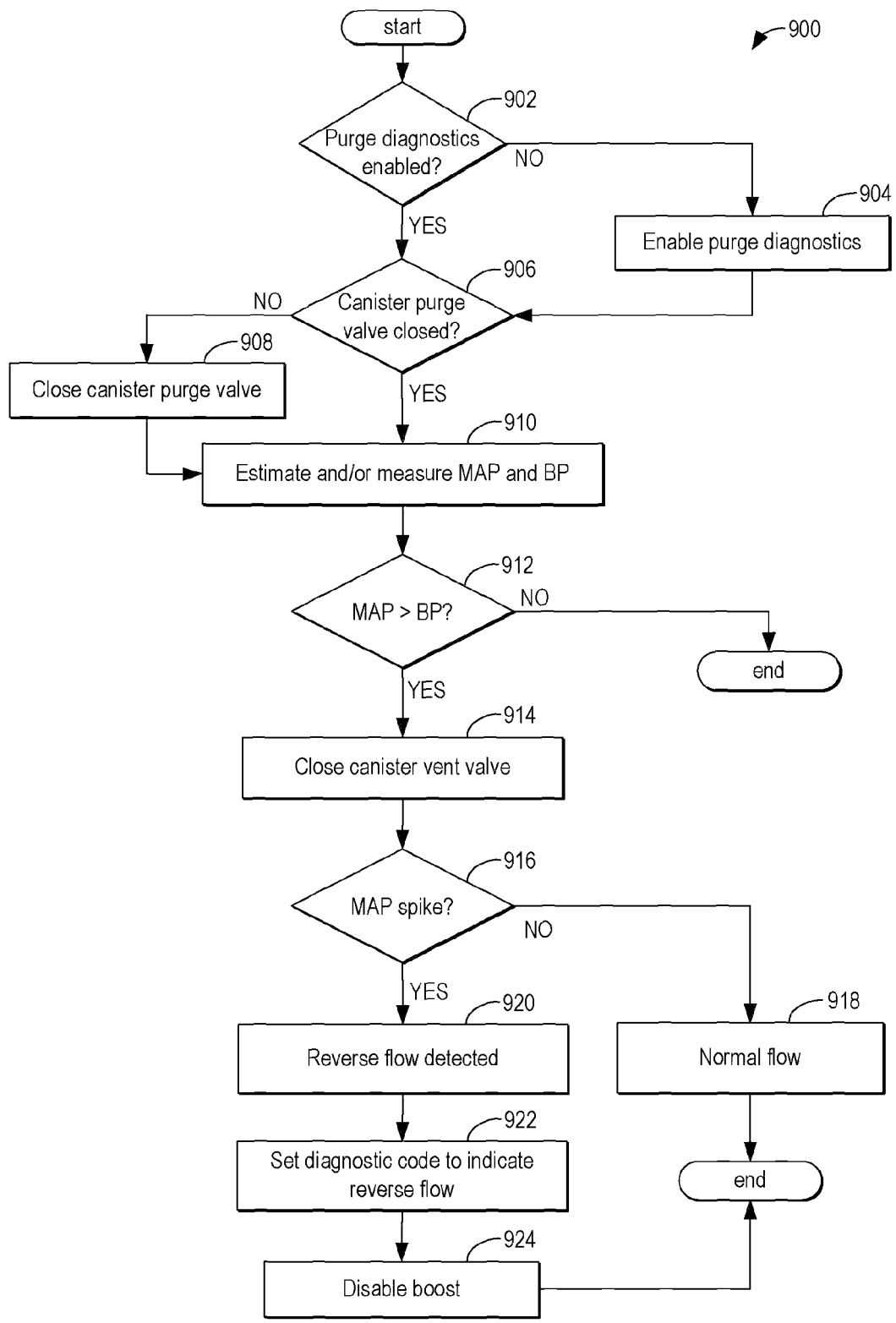

As further elaborated in FIGS. 8-9, the controller may command the canister vent valve to be intermittently closed, by adjusting operation of the canister vent solenoid, to diagnose reverse flow through the fuel vapor recovery system. By commanding the canister vent valve to be closed, the controller may seal the fuel vapor recovery system from the atmosphere.

Fuel vapors released from canister 202, for example during a purging operation, may be directed into intake manifold 44 via purge line 28. The flow of vapors along purge line 28 may be regulated by canister purge valve 112, coupled between the fuel vapor canister and the engine intake. As depicted, canister purge valve 112 may be a ball check valve, although alternative check valves may also be used. The quantity and rate of vapors released by the canister purge valve may be determined by the duty cycle of an associated canister purge valve solenoid 214. As such, the duty cycle of the canister purge valve solenoid may be determined by the vehicle's powertrain control module (PCM), such as controller 12, responsive to engine operating conditions, including, for example, an air-fuel ratio. By commanding the canister purge valve to be closed, the controller may seal the fuel vapor recovery system from the engine intake.

An optional canister check valve 116 may also be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 218 coupled to intake manifold 44, and communicated with controller 12. Alternatively, MAP may be inferred from alternate engine operating conditions, such as a manifold air flow (MAF), as measured by a MAF sensor (not shown) coupled to the intake manifold. As depicted, canister check valve 116 may also be a ball check valve, although alternative check valves may be used. In the depicted example, check valve 116 includes a spring which pre-positions the valve in a closed configuration. As such, the spring may be optional as the flow of air and vapors, depending on the forward or reverse flow, may drive the check valve to the requisite configuration. Thus, during forward flow, check valve 116 may permit the unidirectional flow of air from canister 202 to intake manifold 44. In the event of high pressure air entering the purge line from intake manifold 44, canister check valve 116 may close, thereby preventing the pressure in fuel tank 20 and canister 202 from exceeding design limits. However, if canister check valve 116 is stuck open, high pressure air may enter the fuel vapor recovery system from a boosted intake manifold 44. While the depicted example shows the canister check valve positioned between the canister purge valve and the intake manifold, in alternate embodiments, the check valve may be positioned before the purge valve.

Fuel tank pressure transducer (FTPT) 120, or fuel tank pressure sensor, may be included in purge line 28, coupled between the fuel tank and the engine intake or along vent 27, coupled between the fuel vapor canister and the canister vent valve. As such, FTPT 120 may be configured to identify leaks in the fuel vapor recovery system 22. Engine-off natural vacuum (EONV) leak detection may be enabled by observing changes in a pressure value of the FTPT (for example, failure to hold a vacuum). Specifically, during leak detection, an engine controller may be configured to monitor the presence of a vacuum in the sealed fuel tank after engine shut-off by monitoring the pressure change across a fuel-tank mounted FTPT. A drop in pressure, or vacuum, may occur as the fuel cools down over several minutes following engine shut-off. If a vacuum can be drawn, the system has no leaks. In contrast, if a vacuum cannot be drawn, a leak may be present.

It will be appreciated that current EONV detection methods utilize a FTPT mounted on the fuel tank or positioned between the fuel tank and the fuel vapor canister, specifically between fuel tank 20 and tank isolation valve 205. However, herein, the inventors have recognized that the FTPT may alternatively be positioned between the fuel canister and the canister purge valve, and by including a small orifice 222, the FTPT may be further used as a flow sensor without affecting its ability to perform EONV leak detection. As such, for use as a flow sensor, FTPT 120 may be positioned upstream of orifice 222 (as depicted) or alternatively downstream of orifice 222. Further, orifice 222 may be positioned upstream of the canister purge valve 112. Thus, for flow diagnostics, FTPT 120 and optional downstream orifice 222 may be positioned either in purge line 28 or in conduit 31, substantially between the fuel tank and the tank isolation valve. Further still, FTPT 120 and downstream orifice 222 may alternatively be positioned in vent 27, with FTPT 120 positioned upstream (or downstream) of orifice 222, and orifice 222 positioned upstream of canister vent valve 108, to enable EONV leak detection and purge flow diagnostics.

As further elaborated with respect to the routines described in FIGS. 7-12, FTPT 120 may be further used as a flow sensor to identify improper flow (such as reverse flow) through the fuel vapor recovery system and to identify component (such as canister purge valve or canister check valve) degradation, or as a pressure sensor to identify changes in pressure caused by reverse flow, or combinations thereof. Herein, a fuel vapor recovery system pressure may be estimated by the FTPT and a manifold pressure may be estimated by MAP sensor 218. Subsequently, changes in fuel vapor system pressure, as sensed by FTPT 120, and/or changes in MAP, as sensed by MAP sensor 218, may be used as a purge gas flow sensor to diagnose improper flow through the fuel vapor recovery system (for example, due to a canister purge valve being forced open or a canister check valve stuck open due to valve failure during a boosted engine operation). These changes in pressure may include, for example, a continued FTPT and/or MAP pressure in a high and maximal operating range, or, for example, sudden spikes in FTPT pressure in response to an intermittent closure of the canister vent valve, as further elaborated herein with reference to the routines of FIGS. 7-12.

The fuel vapor recovery system 22 may be operated by controller 12 in a plurality of modes by selective adjustment of the various valves and solenoids. For example, the following operating modes may be performed:

MODE A: Fuel Vapor Storage

During select engine and/or vehicle operating conditions, such as during a fuel tank filling operation and with the engine not running, the controller 12 may adjust the duty cycle of an associated solenoid and intermittently open the canister vent valve to direct fuel vapors through conduit 31, and into fuel vapor canister 202. Additionally in this mode, the controller may close canister purge valve 112 (by adjusting the duty cycle of canister purge valve solenoid 214) to prevent fuel vapors from being purged into the intake manifold. As such, under these conditions, canister check valve 116 may remain open or closed.

MODE B: Fuel Vapor Canister Purging

During select engine and/or vehicle operating conditions, such as after an emission control device light-off temperature has been attained and with the engine running, the controller 12 may adjust the duty cycle of the canister vent valve solenoid and open canister vent valve 108. At the same time, controller 12 may adjust the duty cycle of the canister purge valve solenoid 214 and open canister purge valve 112. In this way, the vacuum generated by the intake manifold of the operating engine may be used to draw fresh air through vent 27 and through fuel vapor canister 202 to purge the stored fuel vapors into intake manifold 44. In this mode, the purged fuel vapors from the canister are combusted in the engine.

In yet another embodiment, rather than using fresh air that is at atmospheric pressure, compressed or boosted air, that is air that has been passed through a compressor of a boosting device (such as a turbocharger or a supercharger) may be used for a boosted purging operation. As such, fuel vapor recovery system may require additional conduits and valves for enabling a boosted purging operation. In still another embodiment, a short-circuited compressor flow can be configured to produce a vacuum to draw in purge air, as further elaborated in FIG. 6.

During purging, the learned vapor amount/concentration can be used to determine the amount of fuel vapors stored in the canister, and then, during a later portion of the purging operation (when the canister is sufficiently purged or empty), the learned vapor amount/concentration can be used to estimate a loading state of the fuel vapor canister.

Figure 3:
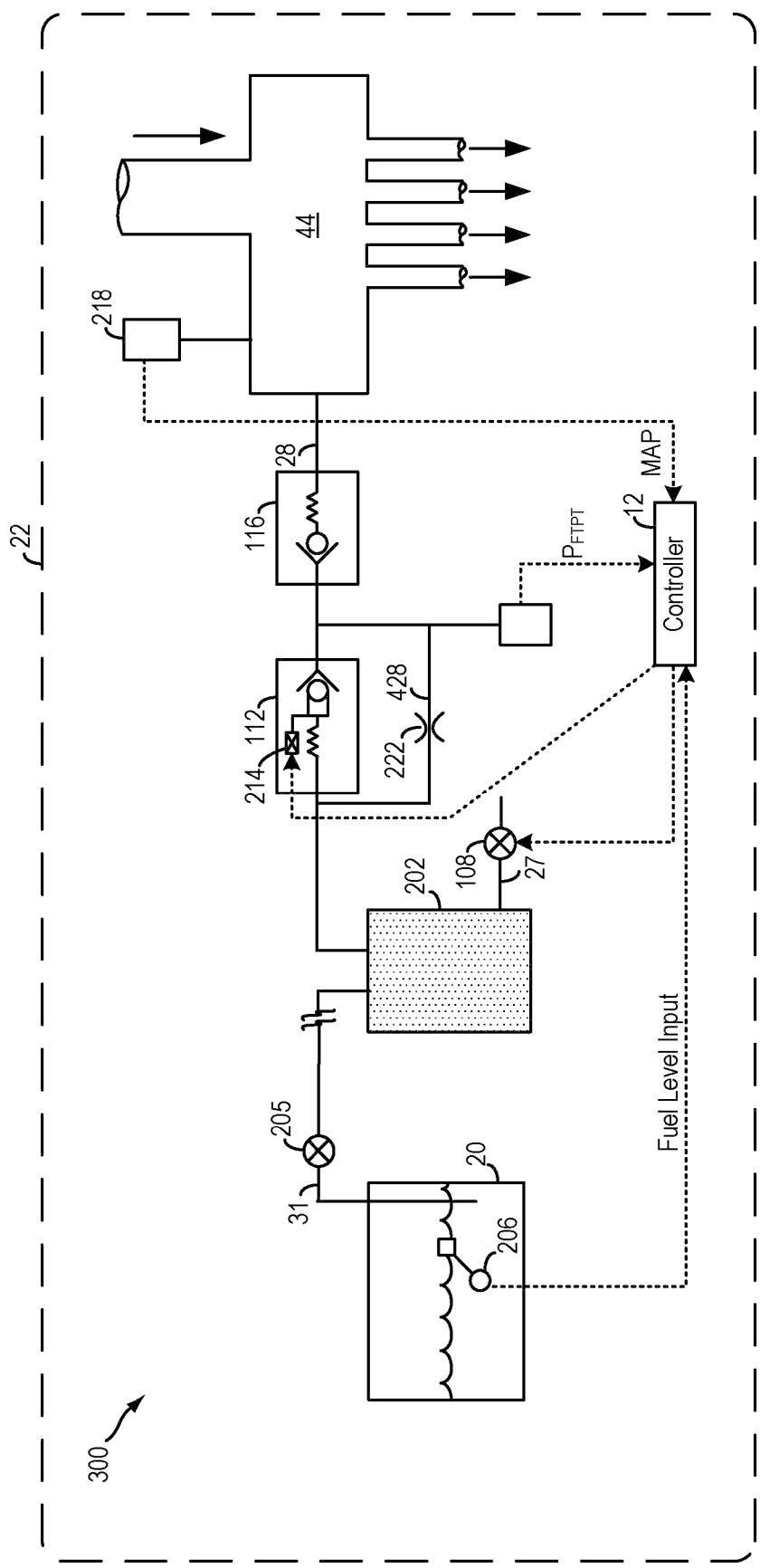

FIG. 3 shows another example embodiment 300 of fuel vapor recovery system 22. In the depicted embodiment, FTPT 120 is positioned between fuel vapor canister 202 and canister check valve 116, but along branched purge line 428, substantially parallel to purge line 28, and substantially across canister purge valve 112. Small orifice 222 may also be included in branched purge line 428. By measuring pressure changes across the small orifice, FTPT 120 may be able to identify reverse flow in the purge line, without affecting its original role in EONV leak detection. In this way, the FTPT may be used as a flow meter, detecting a direction and amount of flow of purged fuel vapors when purge flow is in the forward direction (that is, from the fuel vapor canister 202 to the intake manifold 44), and a direction and amount of boosted air from a boosted intake manifold when flow is in the reverse direction (that is, from the intake manifold to the canister).

Figure 4:
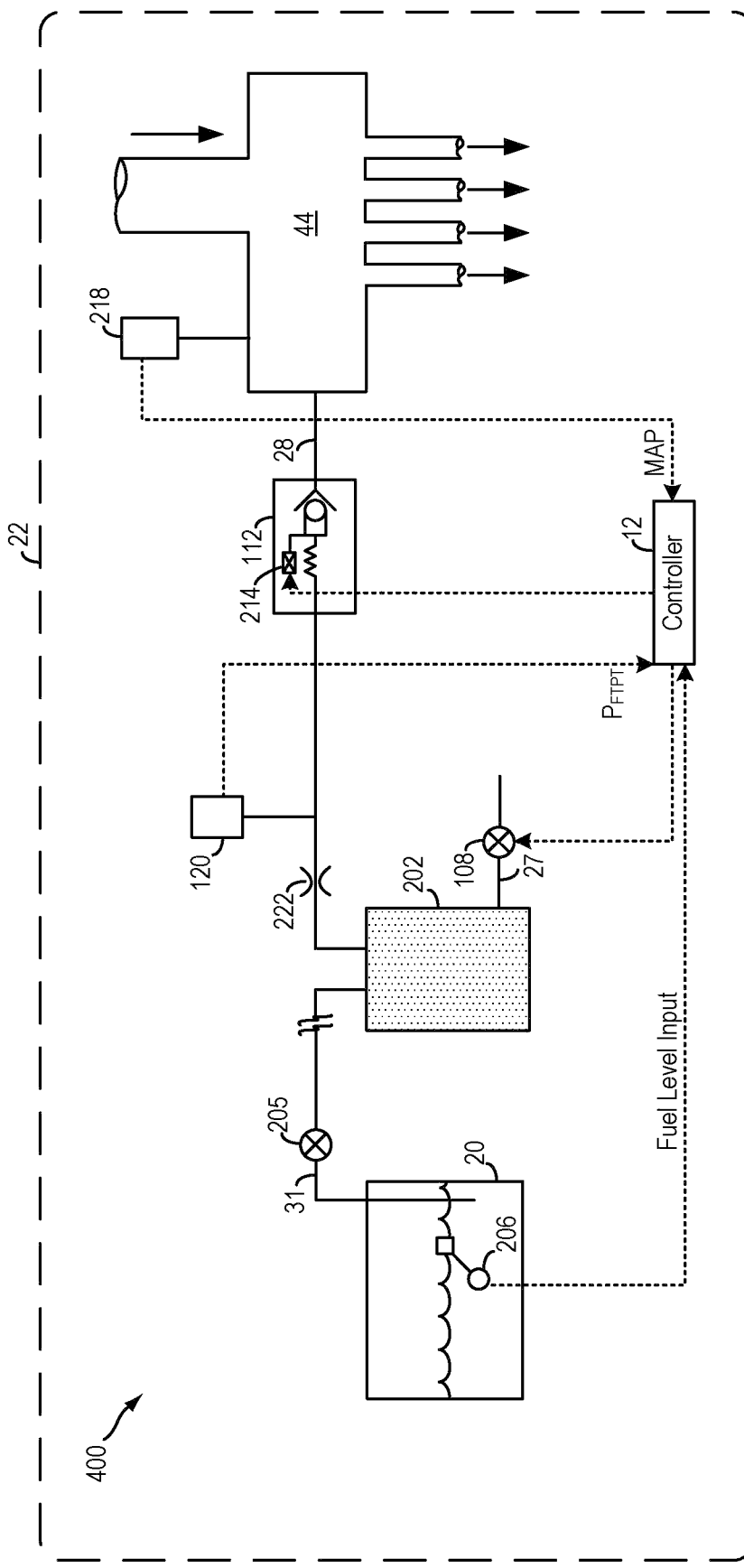

FIG. 4 depicts example embodiment 400 of fuel vapor recovery system 22. As such, embodiment 400 may be substantially similar to the embodiment previously introduced in FIGS. 2-3. However, herein check valve 116 may be omitted. While the depicted example shows FTPT 120 coupled to orifice 222, in an alternate embodiment, FTPT 120 may not be coupled to orifice 222, but may be coupled to the throat of a venturi, as elaborated below with reference to FIG. 5, for flow diagnostics. Additionally, due to the lack of check valve 116, diagnostic routines monitoring flow through the fuel vapor recovery system (such as the routine of FIG. 11) may be configured to assess canister purge valve degradation related reverse flow issues.

Figure 5:
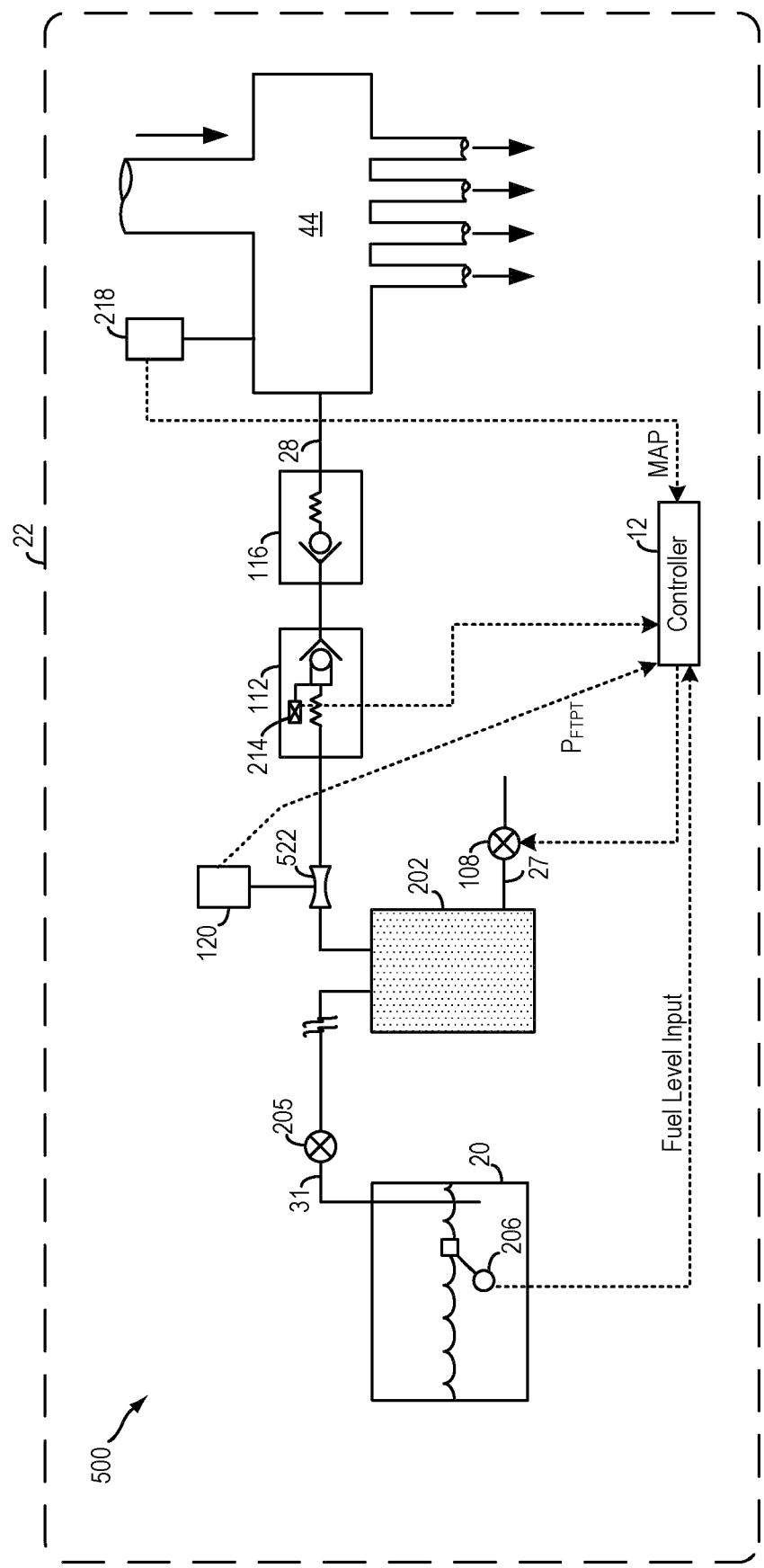

FIG. 5 shows an alternate embodiment 500 of fuel vapor recovery system 22. In the depicted embodiment, FTPT 120 is coupled to the throat of a venturi 522. By coupling the FTPT to the venturi, the flow sensitivity of the FTPT may be enhanced. Specifically, the coupled configuration may enable the FTPT to maintain its original function in EONV leak detection, while further enabling the FTPT to be used as a flow sensor. While the depicted embodiment shows the venturi (with the coupled FTPT) positioned between the intake manifold 44 and the fuel vapor canister 202, in an alternate embodiment, the venturi (with the coupled FTPT) may be positioned between the canister and the atmosphere, along vent 27. In the venturi-coupled configuration, the FTPT output may aid engine controller 12 to diagnose and indicate a reverse flow through the system based on a pressure difference estimated by the FTPT before and after sealing the fuel vapor system at least from the engine intake. As such, a venturi-based flow sensor may not be able to detect a flow direction. However, under boosted conditions, that is, when MAP (as determined by MAP sensor 218) is greater than the barometric pressure (BP), the presence of any flow across the venturi may be ascribed to flow in a reverse direction. In contrast, if MAP is lower than BP, the presence of any flow (or a lack of flow) across the venturi may be correlated with an absence of reverse flow through the fuel vapor recovery system. Specifically, (as further elaborated with reference to FIG. 12) in the event of no flow across the venturi, for example during an engine-off natural vacuum, the FTPT may detect a static pressure. In contrast, in the case of a reverse flow during boosted engine operation, the FTPT may detect a pressure drop. Since venturis have an inherent pressure recovery mechanism, a lower pressure drop may be obtained with venturi 322 versus the pressure restriction of orifice 222 of FIG. 2.

Figure 17:
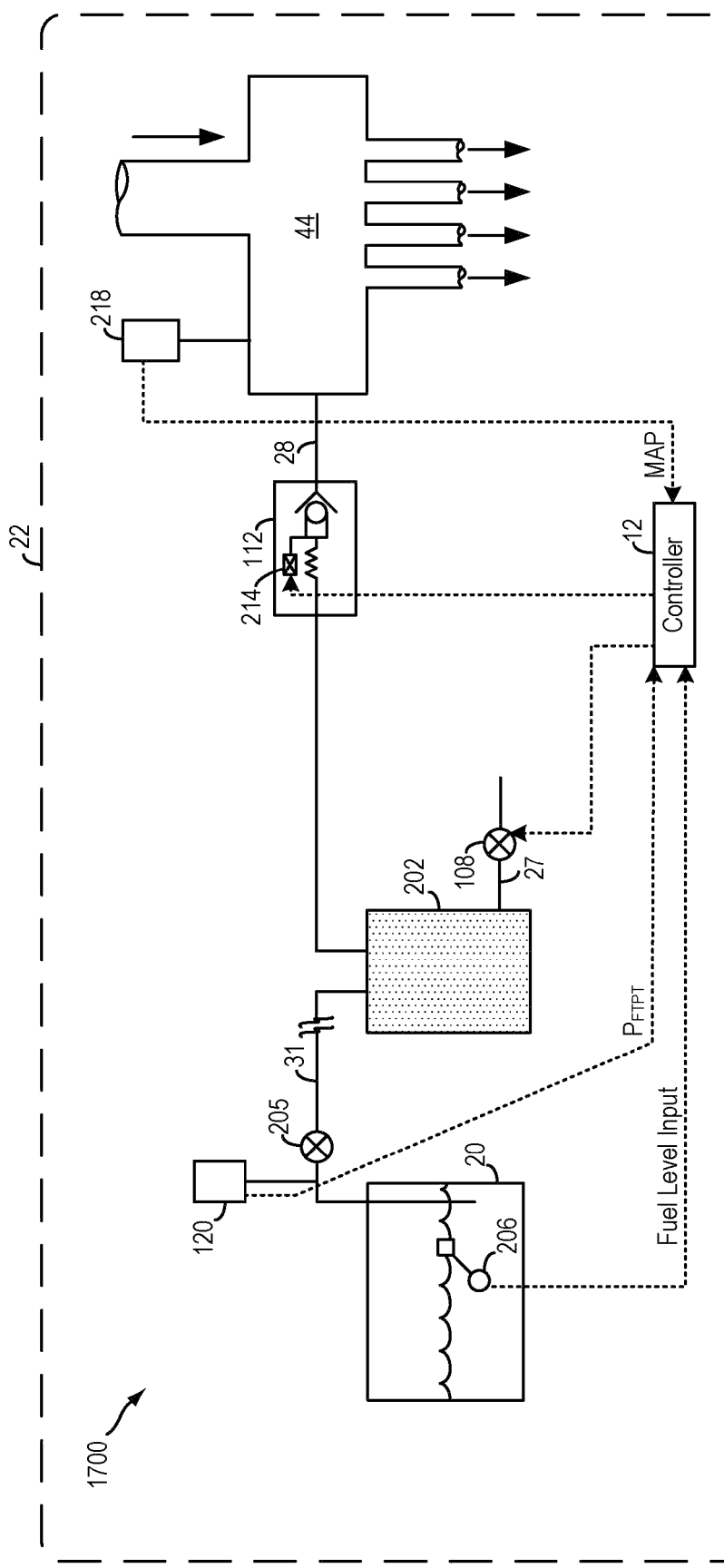

FIG. 17 shows another embodiment 1700 of fuel vapor recovery system 22. As such, embodiment 1700 may be substantially similar to the embodiment previously introduced in FIG. 5. However, herein FTPT 120 may be positioned along conduit 31, substantially between tank isolation valve 205 and fuel tank 20. Furthermore, FTPT 120 may neither be coupled to an orifice nor a venturi.

Figure 6:
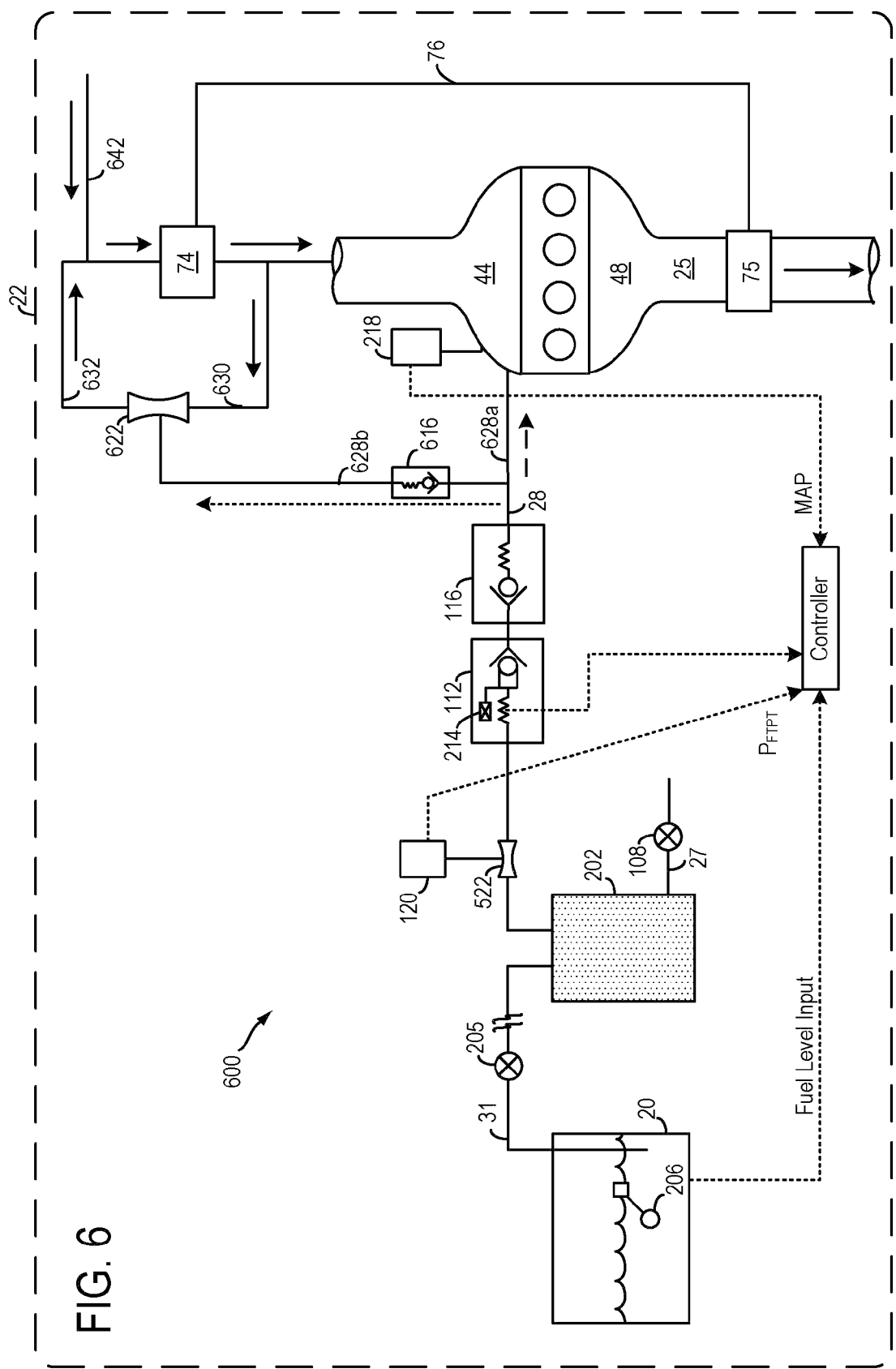

Now turning to FIG. 6, a double path purge system for fuel vapor recovery system 22 is elaborated. Specifically, such a double path purge system allows the fuel vapors in the fuel vapor canister to be purged into the intake manifold either directly using an intake manifold vacuum, or alternatively, with a boost system created vacuum.

FIG. 6 depicts example embodiment 600 of fuel vapor recovery system 22 wherein the fuel vapors may be purged with boosted intake air. Herein, canister purge valve 112 and canister check valve 116 may regulate flow of vapors and air between fuel vapor canister 202 and the intake manifold 44 along purge line 28 that may be further split into purge lines 628a and 628b. As previously depicted in FIG. 3, FTPT 120 is positioned between fuel vapor canister 202 and canister purge valve 112, with FTPT 120 being connected to the throat of venturi 322. However, in alternate embodiments, FTPT 120 may not be connected to a venturi, and instead a small orifice 222 may be provided (for example, as in embodiment 200 of FIG. 2) to enable EONV leak detection and flow diagnostics. Further still, in alternate embodiments, FTPT 120 connected to the throat of venturi 522 may be located in vent 27.

In the depicted embodiment, fuel vapors may be purged along two paths, as indicated by split purge lines 628a and 628b. When purging fuel vapors directly into intake manifold 44, using an intake manifold vacuum, fuel vapors may proceed along purge line 628a (dashed arrow). Alternatively, fuel vapors may be purged using a boost system created vacuum. As depicted, exhaust gas flow through exhaust manifold 25 may drive a turbine 75 connected to the compressor 74 of a boosting device, such as a turbocharger or a supercharger, via shaft 76. Compressor 74 may be configured to provide a boost to intake air received along intake passage 642. While part of the boosted intake air may be provided directly to the intake manifold 44, the other part may be circulated along conduit 630 towards venturi 622. Flow of boosted air through venturi 622 may then create a venturi effect that may enable purge flow from purge line 628b to also be drawn in to venturi 622. In this way, a boosted purge flow may be generated along conduit 632, which may then be purged to the intake manifold. An additional check valve 616 may be included in purge line 628b to ensure unidirectional flow of vapors along purge line 628b. As such, during a boosted purging operation, canister check valve 116 may remain closed while check valve 616 may be opened. In the event of a degradation of check valve 116 (that is, check valve 116 remains stuck open), the boosted purging mixture may cause canister purge valve 112 to be forced open and reverse flow may ensue. By using FTPT 120 as a flow meter, and further using diagnostic routines such as those depicted in FIGS. 7-12 and 15-16, such improper flows may be rapidly detected and appropriate measures (such as an immediate disabling of the boost) may be taken in a timely manner.

In this way, as illustrated in FIGS. 2-6 and 17, an FTPT may diagnose improper flow through a vapor recovery system (either via flow inference, or pressure readings) in addition to its function in EONV leak detection. While the depicted embodiments use an FTPT, it will be appreciated that in alternate embodiments, a flow meter may be used alternatively or additionally. By using the FTPT, the need for additional hardware components (such as an additional pressure sensor and pressure relief valves) for flow diagnostics may be reduced, thereby reducing the number of components required for flow diagnostics (although additional sensors may be used, if desired). By identifying improper flow through the vapor recovery system at an early stage, component damage, as may be caused by improper and over-pressurized air flow through the system components, may be reduced. Additionally, over-pressure induced fuel vapor emissions may be reduced.

Controller 12 may be configured to identify flow errors and component degradation (such as check valve and/or canister purge valve degradation) using pressure-change based diagnostic routines. In one example, the pressure-change based diagnostic routines may include comparing a first and second pressure value estimated before and after sealing the fuel vapor recovery system (for example, before and after sealing the fuel vapor recovery system from the intake manifold and/or the atmosphere). In another example, the pressure-change based diagnostic routines may include comparing a first and second change in pressure estimated before and after sealing the fuel vapor recovery system (for example, before and after sealing the fuel vapor recovery system from the intake manifold and/or the atmosphere). By performing pressure-based diagnostic routines, the controller may identify the presence or absence of reverse flow, and further identify component degradation that may be responsible for the reverse flow. By further commanding mitigating measures, for example boost disablement, responsive to the detection of a reverse flow, further degradation of the fuel vapor recovery system may be reduced. It will be appreciated that while the diagnostic routines depicted in FIGS. 7-12, and 15-16 disable boost responsive to an indication of degradation, in alternate embodiments, additional or alternate mitigating measures may be used.

In one particular approach, during boosting, the canister purging system can be monitored to identify reverse flow from the intake manifold into (and through) the canister purging system. In such conditions, the flow through the canister purging system will generate pressure in the canister purging system that can be monitored. Additionally, or alternatively, the flow itself can be monitored. The conditions under which such reverse flow can occur can be caused to occur, or may occur naturally during vehicle operation.

Also, parameters of the canister purging system can be adjusted to enhance the detectability of such reverse flow conditions. For example, restriction in the canister purging system can be enhanced so that any reverse flow that inadvertently occurs will cause a greater impact on observed pressure. For example, increasing a restriction out of the canister purging system (e.g., by closing a canister vent valve) under a condition in which reserve flow is present (e.g., due to a degraded check valve or purge valve) generates a more rapid and greater pressure rise in the canister purging system.

Finally, active adjustment of parameters of the canister purging system may be used to increase correlation of sensed data to degradation conditions. As such, if an amount of reverse flow is affected by adjusting a restriction of the canister purging system (e.g., by adjusting a canister vent valve), then it may be possible to monitor pressure in the canister purging system and correlate changes of that pressure with the commanded changes aimed at adjusting the system restriction. In one example, if the pressure in the canister purging system changes in concert with changes in the vent valve under a condition in which the intake manifold is commanded to be sealed from the canister purging system, then this indicates that in actuality the commanded seal has not been sufficiently achieved. In another example, if the pressure in the canister purging system does not change in concert with changes in the purge valve (where the intake manifold is commanded to be sequentially sealed and unsealed from the canister purging system), this can indicate that in both cases the seal was not present, or in both cases it was present—neither of which includes proper functioning. Moreover, rather than, or in addition to, monitoring pressure of the he pressure in the canister purging system changes in concert with changes in the vent valve under a condition in which the intake manifold is commanded to be sealed from the canister purging system, changes (or lack thereof) in manifold pressure may be used.

Figure 7:
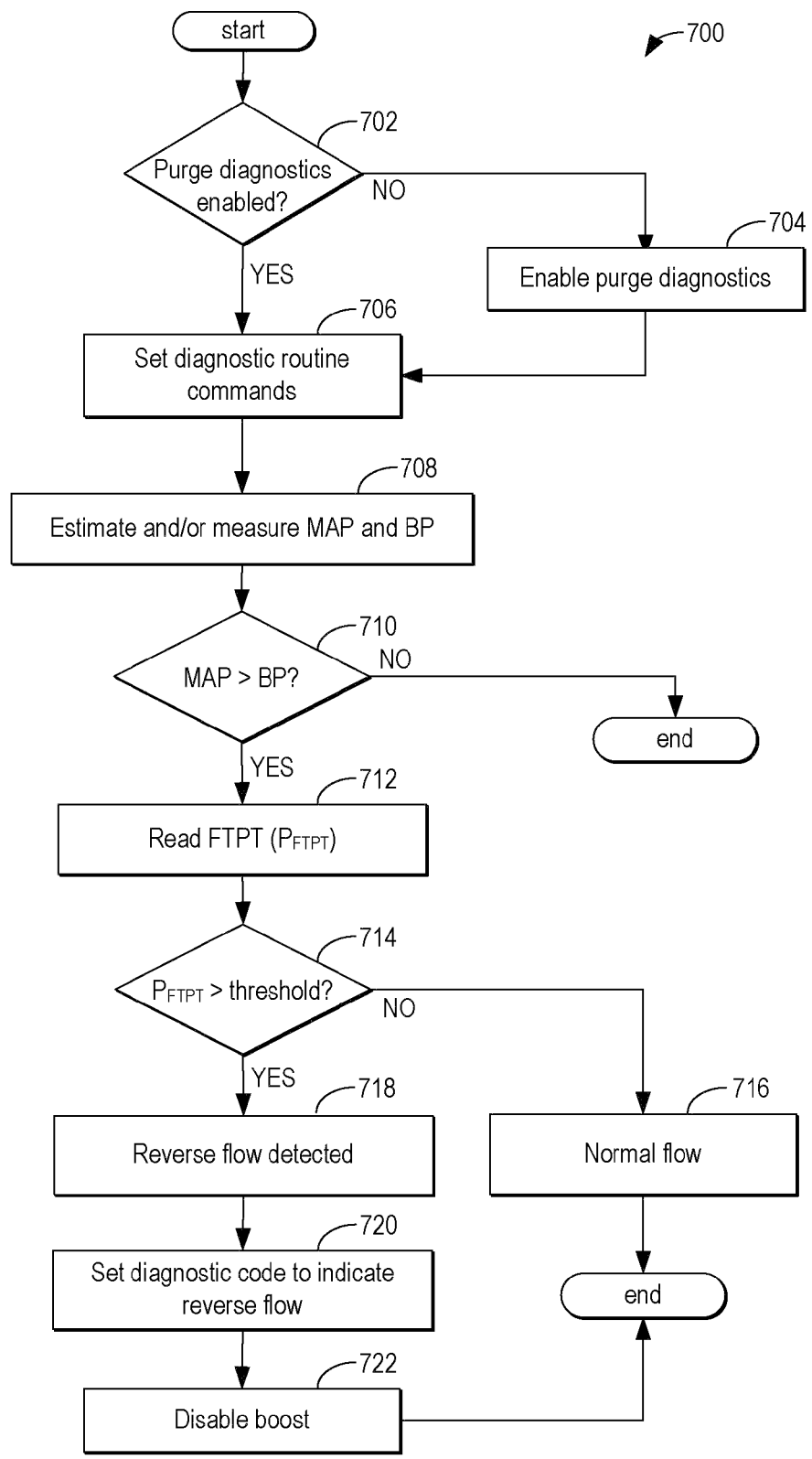
FIGS. 7-12 show high level flow charts illustrating pressure-sensitive routines that may be implemented for identifying reverse flow and related component degradation in the fuel vapor recovery system of FIG. 1.
Figure 15:
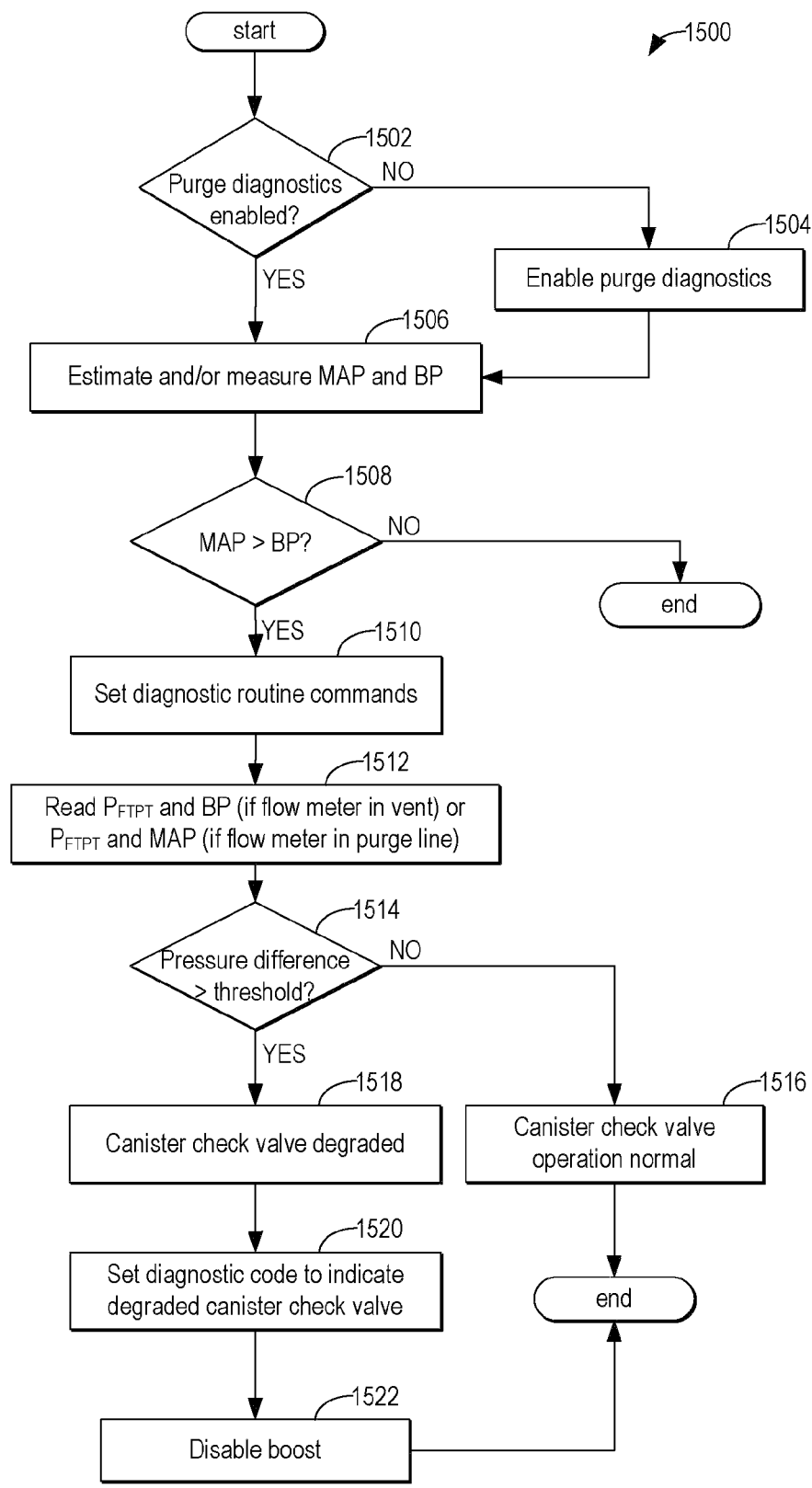
FIGS. 15-16 show high level flow charts illustrating flow-sensitive routines that may be implemented for identifying reverse flow and related component degradation in the fuel vapor recovery system of FIG. 1.
Figure 16:
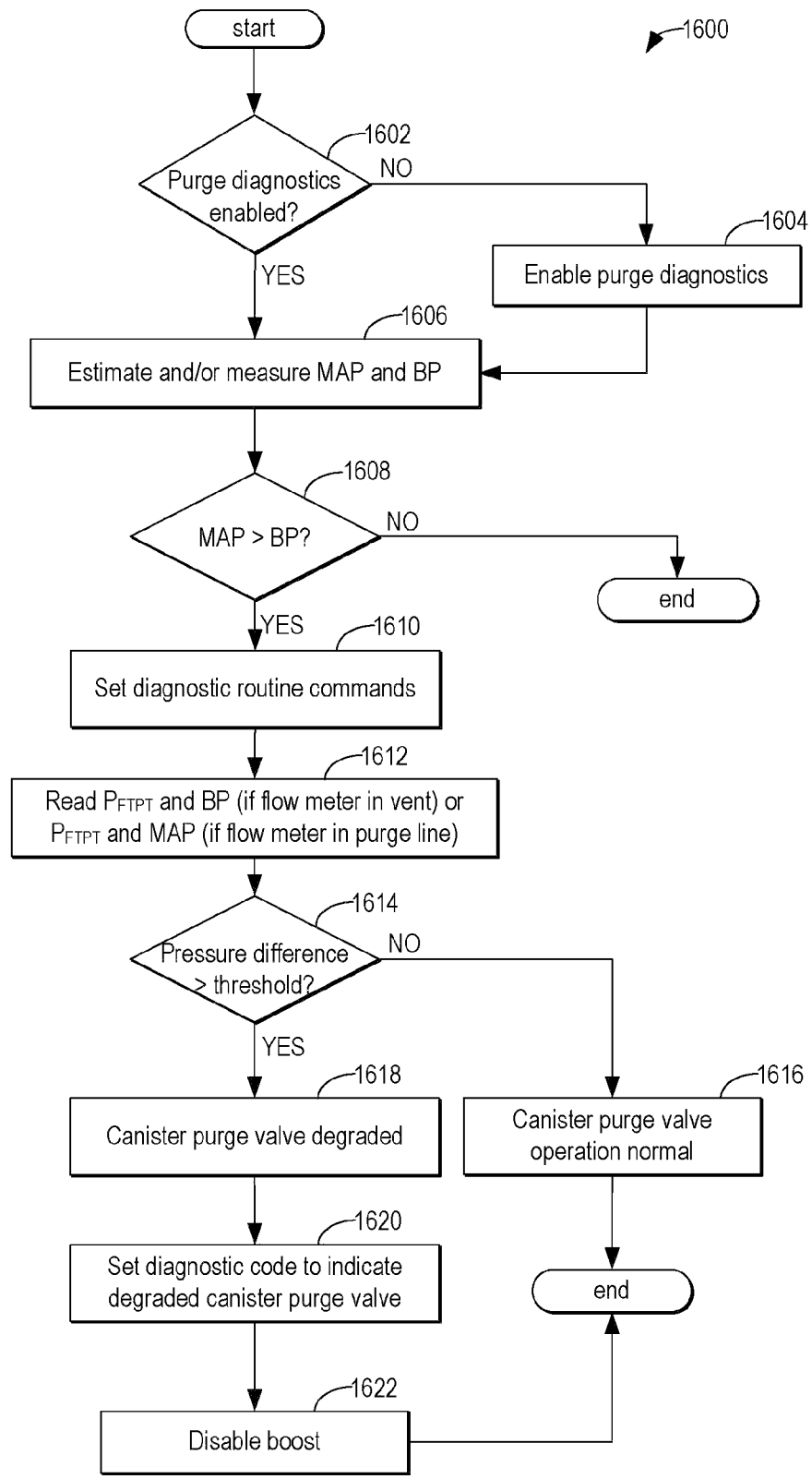

FIGS. 7-12 depict example diagnostic routines that may be performed by controller to monitor reverse flow of fuel vapors and/or air through a vehicle fuel vapor recovery system. The different routines enable degradation to be indicated, during boost, based on a pressure value in the system, when the fuel vapor recovery system is commanded to be sealed, partially un-sealed, or intermittently sealed, from the engine intake and/or atmosphere. Similarly, FIGS. 15-16 depict example diagnostic routines that may be performed by controller to monitor reverse flow of fuel vapors and/or air through a vehicle fuel vapor recovery system, during boost, based on the presence of a flow through the system, when the fuel vapor recovery system is commanded to be sealed, partially un-sealed, or intermittently sealed, from the engine intake and/or atmosphere. FIG. 7 depicts a diagnostic routine 700 for identifying improper flow through the fuel vapor recovery system. Specifically, the routine may identify reverse flow of air through the canister purging system, for example due to entry of boosted air into the canister from the intake manifold due to a canister purge valve that is stuck open or due to a degraded canister check valve. As such, diagnostic routine 700 may be used in an embodiment of the fuel vapor recovery system including, or not including, a canister check valve, (one example of which is illustrated in the embodiments of fuel vapor recovery system 22 including FTPT 120 coupled upstream of orifice 222). By diagnosing reverse flow and then disabling boost in response to the diagnosis, improper flow of higher pressure air from the intake manifold to the canister and fuel tank may be reduced, thereby reducing the risk of the canister and/or fuel tank from exceeding design limits of pressure, while also reducing undesirably high fuel vapor emissions into the atmosphere.

At 702, it is determined whether a purge diagnostics mode has been enabled or not. That is, it determined whether the settings on the controller have been set for purge diagnostics. In one example, this may include adjusting duty cycles for the solenoids associated with the canister vent valve and/or the canister purge valve. If purge diagnostics have not been enabled at 702, then at 704, it is enabled. Next at 706, the settings for the diagnostic routine may be commanded. This may include commanding the canister purge valve (CPV) to be closed, open, or partially open, by accordingly adjusting the state of the canister purge valve solenoid. For example, in systems including a check valve in series with the CPV (e.g., FIG. 2), the CPV may be commanded open to diagnose the check valve. Alternatively, in systems without a check valve in series with the CPV, the CPV may be commanded closed. In one example, by commanding the canister purge valve to be closed, the fuel vapor recovery system may be sealed from the engine intake.

The commanding of diagnostic settings may further include commanding the canister vent valve to be closed, by accordingly adjusting the state of the canister vent solenoid. By commanding the canister vent valve (CVV) to be closed, the fuel vapor recovery system may be sealed from the atmosphere. However, in alternate embodiments, the canister vent valve may remain open. As such, since the diagnostic routine is based on a pressure measurement of the FTPT, by commanding the canister vent valve to be closed, a relatively larger pressure difference may be observed in a shorter diagnostic interval. Commanding the settings for the diagnostic routine may further include commanding an optional tank isolation valve (TIV) of the fuel vapor recovery system to be closed. However, in alternate embodiments, the tank isolation valve may remain open. Since the diagnostic routine is based on a pressure measurement of the FTPT, by commanding the tank isolation valve to be closed, during a reverse flow, the detectable pressure difference may be observed relatively faster, for example within a few seconds of sealing the system. Additionally, by concurrently closing the tank isolation valve along with the canister vent valve, the risk of inflating the liquids in the fuel tank may be reduced.

At 708, the manifold absolute pressure (MAP) and barometric pressure (BP) may be measured and/or estimated. At 710, it may be determined whether the MAP is greater than the BP, that is, if a boosted condition is present. If no boost is present, then the diagnostic routine may end. However, if a boosted condition is established, at 712, a pressure value in the fuel vapor recovery system may be estimated by the FTPT and the pressure value ($P_{FTPT}$) may be noted. At 714, it may be determined whether, under the given diagnostic settings (for example, with the fuel vapor recovery system sealed from the intake), if the pressure value ($P_{FTPT}$) is greater than a threshold. In one example, it may be determined whether the absolute pressure of the system, as estimated by the FTPT, has risen above a threshold. In another example, the rate of pressure change, for example, the rate of pressure rise, may be estimated. In yet another example, a pressure difference, for example, a pressure difference between the boost pressure and the system pressure ($P_{FTPT}$) may be compared to a threshold value. The boost pressure may be calculated as a difference between the estimated manifold air pressure and the barometric pressure, that is, as (MAP-BP). The pressure difference between the boost pressure and the fuel vapor recovery system pressure may then be calculated as $\{(MAP-BP)-P_{FTPT}\}$. In still another example, a pressure difference between a first pressure estimated before sealing the system and a second pressure estimated after sealing the system may be compared to the threshold. Further still, other pressure difference calculations may also be used. As such, the threshold may be an absolute pressure value or a pressure range. Furthermore, the threshold may be adjusted responsive to the boost pressure. Thus, as the boost pressure increases, the threshold may be increased.

In one example, the threshold may be a maximal in-range pressure of the FTPT. If under the diagnostic routine conditions (for example, with the CPV, CVV, and TIV closed), the pressure value (for example, the absolute pressure $P_{FTPT}$, or the calculated pressure difference) is not above the threshold, then a normal flow of air and vapors through the fuel vapor recovery system may be deduced at 716. If the pressure value is greater than the threshold, for example, if $P_{FTPT}$ is consistently in the maximal pressure range of the sensor, then an improper or reverse flow of air and vapors through, and degradation of, the fuel vapor recovery system may be concluded at 718. Accordingly, a diagnostic code may be set at 720 to indicate degradation and reverse flow through the system. Additionally, to reduce the chance that the boosted air flows improperly into the fuel vapor canister and fuel tank, boost may be disabled (for example, by disabling the boosting device) at 722, in response to the indication of degradation. In this way, degradation of the fuel vapor recovery system may be diagnosed during boost, in response to a pressure value in the system being greater than a threshold, and further, may be promptly addressed.

In FIGS. 8-9, diagnostic routines are described wherein by intermittently adjusting a restriction in the fuel vapor recovery system during boosted conditions, reverse flow and degradation of a fuel vapor recovery system may be indicated based on a change in pressure value in the system. Herein, the pressure value may include a fuel vapor recovery system pressure, as estimated by FTPT 120, an engine intake manifold pressure, as estimated by MAP sensor 218, or a pressure difference between a first pressure estimated before adjusting the restriction and a second pressure value estimated after adjusting the restriction.

Now turning to FIG. 8, another diagnostic routine 400 is described for identifying improper flow, such as reverse flow, through the fuel vapor recovery system. As such, in the routine of FIG. 7, a gradual change in a pressure value is used to determine reverse flow in the system. In contrast, the routine of FIG. 8 determines reverse flow through the system based on more sudden changes (for example, sudden spikes) in pressure value estimated by the FTPT in response to an intermittent closing of the canister vent valve. Diagnostic routine 800 may be used in an embodiment of the fuel vapor recovery system including, or not including, a canister check valve, as illustrated in the embodiments of fuel vapor recovery system 22 including FTPT 120 coupled upstream of orifice 222.

At 802, it is determined whether a purge diagnostics mode has been enabled or not. If purge diagnostics have not been enabled at 802, then at 804, it is enabled. Next, at 806, it is determined whether the canister purge valve has been commanded to be closed. If the canister purge valve (CPV) is not closed at 806, then at 808, the CPV is closed. At 810, MAP and BP may be measured and/or estimated. At 812, it may be determined whether MAP is greater than BP, that is, if a boosted condition is present. If no boost is present, then the diagnostic routine may end. Once a boosted condition has been established, at 816, the FTPT may be read and the pressure value ($P_{FTPT}$) may be noted. At 818, the canister vent valve may be commanded to be closed. Additionally, along with the canister vent valve, the tank isolation valve may also be closed. However, in alternate embodiments, the (optional) tank isolation valve may remain open. As previously explained, by closing the tank isolation valve, the diagnostics time may be reduced by enabling a faster detection of a pressure change. Since the diagnostic routine is based on a pressure measurement of the FTPT, in the event of a reverse flow, a sudden change in pressure, for example a sudden spike or increase in pressure, may be expected at the time of canister vent valve closing. Accordingly, at 820, it may be determined whether $P_{FTPT}$ suddenly exceeds a threshold. As such, the threshold may be an absolute pressure value or a pressure range. If in response to canister vent valve closure, $P_{FTPT}$ does not spike, then a normal flow of air and vapors through the fuel vapor recovery system may be concluded at 822. In contrast, if $P_{FTPT}$ spikes in response to the sudden canister vent valve closure, and the pressure is greater than the threshold, then an improper or reverse flow of air and vapors through the fuel vapor recovery system may be concluded at 824. While the depicted example uses an absolute value of $P_{FTPT}$ to diagnose reverse flow, as previously elaborated, it will be appreciated that in alternate embodiments, a rate of pressure change or a pressure difference, or an alternate pressure value may be used to diagnose the reverse flow.

In response to a determination of reverse flow at 824, a diagnostic code may be set at 826. Additionally, to reduce the chance that the boosted air flows into the fuel vapor canister and fuel tank, boost may be disabled at 828. In one example, the diagnostic routine of FIG. 8 may be run with a predetermined periodicity (for example, once every drive cycle if a boosted condition is reached for a length of time that would enable flow detection) such that the canister vent valve is intermittently closed and the consequent change in $P_{FTPT}$ is monitored over time. In the event of an improper flow, $P_{FTPT}$ may be expected to rise and fall with a periodicity matching the (intermittent) opening and closing of the canister vent valve.

Now turning to FIG. 9, another diagnostic routine 900 is described for identifying improper flow, such as reverse flow, through the fuel vapor recovery system. In contrast to the routine of FIG. 8, the routine of FIG. 9 determines reverse flow through the system based on pressure changes related to intake manifold pressure, as estimated by the MAP sensor, in response to an intermittent closing of the canister vent valve. Diagnostic routine 900 may be used in an embodiment of the fuel vapor recovery system including, or not including, a canister check valve, as illustrated in the embodiments of fuel vapor recovery system 22 including FTPT 120 coupled upstream of orifice 222.

At 902, it is determined whether a purge diagnostics mode has been enabled or not. If purge diagnostics have not been enabled at 902, then at 904, it is enabled. Next, at 906, it is determined whether the canister purge valve has been commanded to be closed. If the canister purge valve is not closed at 906, then at 908, the purge valve is closed. At 910, MAP and BP may be measured and/or estimated. At 912, it may be determined whether MAP is greater than BP, that is, if a boosted condition is present. If no boost is present, then the diagnostic routine may end. Once a boosted condition has been established, at 914, the canister vent valve may be closed. Additionally, along with the canister vent valve, the tank isolation valve may also be closed to expedite the pressure change and the diagnostic routine. However, in alternate embodiments, the tank isolation valve may remain open. As such, closing of the canister vent valve causes flow out of the canister to be blocked and may further cause any improper flow out of the intake manifold to also be blocked. Consequently, in the case of improper flow through the system, MAP may be expected to rise in response to canister vent valve closure. Accordingly, at 916, it may be determined whether MAP suddenly spikes and exceeds a predetermined threshold. As such, the threshold may be an absolute pressure value or a pressure range. If in response to canister vent valve closure, MAP does not spike, then a normal flow of air and vapors through the fuel vapor recovery system may be concluded at 918. In contrast, if MAP spikes in response to canister vent valve closure, and the pressure is greater than the threshold, then an improper or reverse flow of air and vapors through the fuel vapor recovery system may be concluded at 920. Additionally, a diagnostic code may be set at 922 to indicate reverse flow through the system. Further, boost may be disabled at 924.

In one example, the diagnostic routine of FIG. 9 may be run with a predetermined periodicity (for example, once every drive cycle if a boosted condition is reached for a length of time that would enable flow detection) such that the canister vent valve is occasionally closed and the consequent change in MAP is monitored. In the event of an improper flow, MAP may be expected to rise and fall with a periodicity matching the opening and closing of the canister vent valve. An example of such a map is provided herein with reference to FIG. 13.

While in the depicted examples of FIGS. 8-9, intermittently adjusting the restriction includes intermittently sealing the fuel vapor recovery system from the atmosphere by intermittently commanding the canister vent valve to be closed, in alternate embodiments, the restriction may be intermittently adjusted by intermittently sealing the fuel vapor recovery system from the intake by intermittently commanding the canister purge valve to be closed. Additionally, while the depicted examples illustrate indicating degradation based on a change in a pressure value, in alternate embodiments, indicating degradation may be based on a change in flow in the system. In one example, FTPT 120 may be coupled to a venturi and the change in flow may be estimated by the presence of a flow across the venturi (for example, based on a pressure difference across the venturi being greater than a threshold). Further still, while the depicted example correlates system degradation with reverse flow, in alternate embodiments, the routine may further correlate reverse flow and system degradation to a component degradation, for example, degradation of a check valve.

Figure 13:
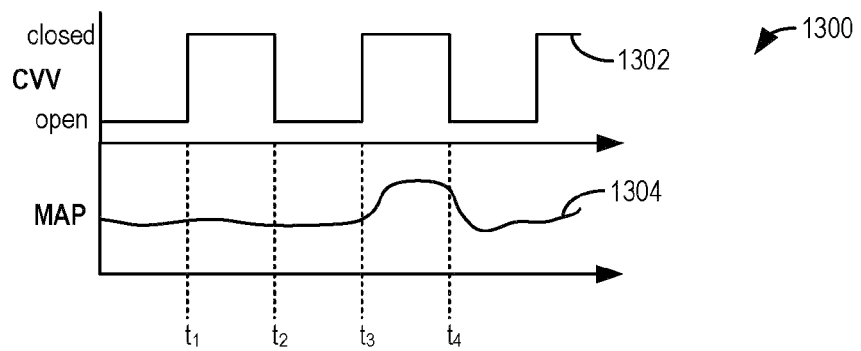
FIG. 13 shows a map depicting changes in manifold pressure responsive to changes in the state of a canister vent valve, as may be used for identifying reverse flow in the routine of FIG. 9.

In FIG. 13, map 1300 depicts a state of the canister vent valve (CVV) at 1302. Herein, the CVV may be periodically shifted between open and closed states. At 1304, a corresponding change in manifold pressure (MAP) is depicted. As illustrated, between time points $t_1$ and $t_2$, in response to CVV closure, no substantial change in MAP may be observed. Thus, a normal flow of vapors through the fuel vapor recovery system may be concluded during this time frame. In contrast, between time points $t_3$ and $t_4$, in response to CVV closure, a rise in MAP may be observed, the MAP subsequently falling in response to CVV opening. Herein, an improper or reverse flow of vapors through the fuel vapor recovery system may be concluded during this time frame. In this way, using a map, such as map 1300, the diagnostic routine of FIG. 9 may be configured to detect improper flow of vapors through the fuel vapor recovery system.

Figure 10:
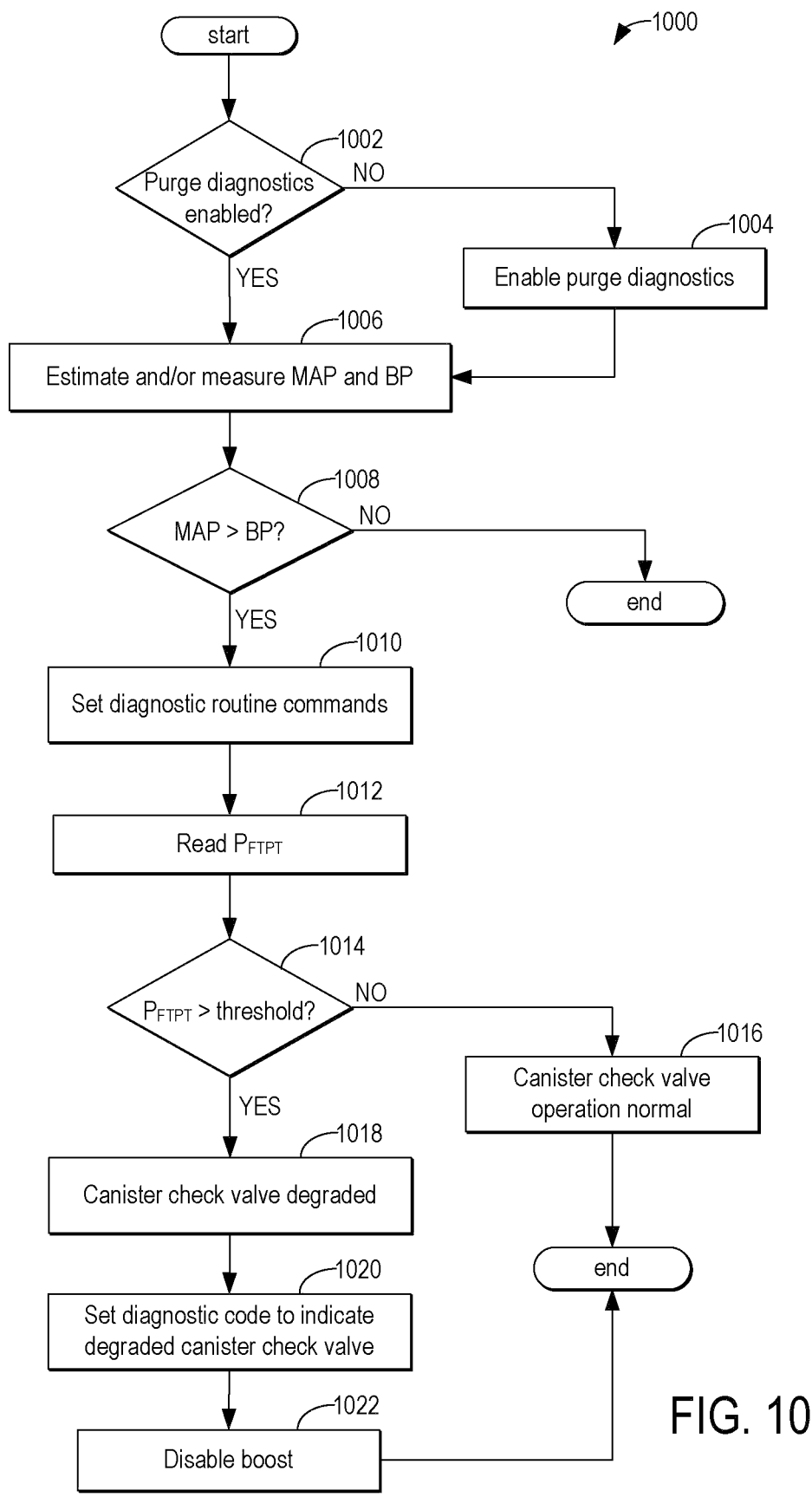

Now turning to FIG. 10, an example diagnostic routine 1000 for identifying reverse flow due to degradation in a canister check valve, coupled in series with the canister purge valve, is described. By identifying degradation in the canister check valve, for example identifying that the check valve is stuck open when it should be closed, reverse air flow (from the intake manifold to the canister and fuel tank) detection may be expedited. In the case of canister check valve degradation during a boosted engine operation, improper flow of higher pressure air from the intake manifold can cause the canister and fuel tank to exceed design limits of pressure, while also causing undesirably high fuel vapor emissions into the atmosphere. As such, diagnostic routine 1000 may be used in embodiments of the fuel vapor recovery system wherein a canister check valve is included.

At 1002, it is determined whether a purge diagnostics mode has been enabled or not. If purge diagnostics have not been enabled at 1002, then at 1004, it is enabled. At 1006, MAP and BP may be measured and/or estimated. At 1008, it may be determined whether the MAP is greater than the BP, that is, if a boosted condition is present. As such, the difference between the estimated MAP and the estimated BP may represent a boost pressure. If no boost is present, then the routine may end. Once a boosted condition has been established, at 1010, the settings for the diagnostic routine may be commanded. This may include commanding the canister vent valve (CVV) to be closed, by accordingly adjusting the state of the canister vent solenoid. By commanding the canister vent valve to be closed, the fuel vapor recovery system may be sealed from the atmosphere. However, in alternate embodiments, CVV may remain open. Additionally, the fuel vapor recovery system may be at least partially un-sealed from the engine intake during the boosted condition. Herein, the canister purge valve (CPV) may be commanded to be opened, or at least partially opened, by accordingly adjusting the state of the canister purge valve solenoid. Degradation may then be indicated based on a pressure transducer positioned between the fuel vapor canister and the engine intake. In one example, during an "active diagnostics" mode, the CPV may be actively commanded to be opened, under boosted engine conditions, to verify check valve operation. In doing so, the controller may actively ensure that under conditions of boost, and even under conditions of a degraded CPV (that is, an open CPV), the check valve is operational and is able to prevent boosted air flow from entering the fuel vapor recovery system. Further still, the tank isolation valve (TIV) of the fuel vapor recovery system may be commanded to be closed. However, in alternate embodiments, the tank isolation valve may remain open. Since the diagnostic routine is based on a pressure measurement of the FTPT, by commanding the tank isolation valve and the canister vent valve to be closed, during a reverse flow, the detectable pressure difference may be observed relatively faster, for example within a few seconds of sealing the system. Additionally, by concurrently closing the tank isolation valve along with the canister vent valve, the risk of inflating the liquids in the fuel tank may be reduced.

At 1012, the fuel vapor recovery system pressure, as indicated by the FTPT pressure value ($P_{FTPT}$), may be read. In one example, as further elaborated in FIG. 14, the pressure may be monitored for a predetermined time, for example, a test time. A timer may be started when the canister vent valve is closed to mark a starting time of $P_{FTPT}$ monitoring. The canister vent valve may then be opened once the time on the timer has elapsed. At 1014, it may be determined whether the estimated pressure is greater than a threshold. As such, the threshold may be an absolute pressure value or a pressure range. Furthermore, the threshold may be adjusted responsive to the boost pressure. If the estimated pressure difference is not above the threshold, then at 1016, normal canister check valve operation and a proper flow of air and/or vapors through the fuel vapor recovery system may be concluded. In one example, if the estimated pressure is greater than the threshold, then at 1018, it may be concluded that the canister check valve has degraded, for example, it may be determined that the check valve is stuck open and that a reverse flow of air and/or vapors through the fuel vapor recovery system in under way. In another example, as elaborated in FIG. 14, it may be determined whether the estimated pressure exceeded the pressure threshold for an amount of time greater than a predetermined fault time threshold. Accordingly a diagnostic code may be set at 1020 to indicate the canister check valve degradation. Additionally, boost may be disabled at 1022. While the depicted example uses an absolute value of $P_{FTPT}$ to diagnose canister check valve degradation, as previously elaborated, it will be appreciated that in alternate embodiments, a rate of pressure change or a pressure difference, or an alternate pressure value may be used to diagnose the reverse flow.

Figure 14:
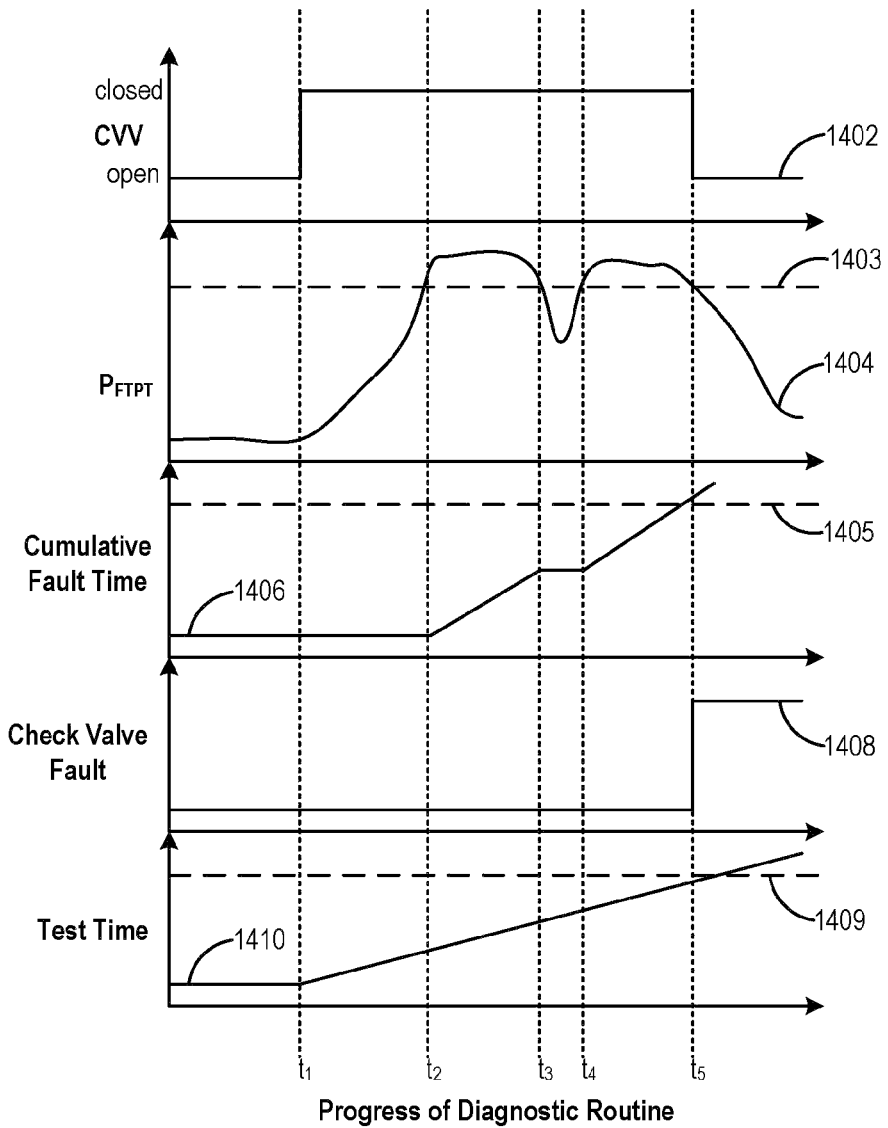
FIG. 14 shows a map depicting changes in fuel tank pressure responsive to changes in the state of a canister vent solenoid, as may be used for identifying component degradation in the routine of FIG. 10.

To further explain the routine of FIG. 10, an example map is provided herein with reference to FIG. 14. In FIG. 14, map 1400 depicts a state of the canister vent valve (CVV) at 1402. Herein, the CVV may be opened for a predetermined test time, as illustrated at 1410. Specifically, at $t_1$, a test timer may be started and CVV may be opened, for example, by energizing the associated canister vent solenoid. When the test timer exceeds a predetermined test time threshold 1409, or if a check valve fault is identified (such as at $t_5$), the CVV may be closed, for example, by de-energizing the associated canister vent solenoid. Curve 1404 represents the output of the FTPT, $P_{FTPT}$, over the period of the test time. A fault timer may be configured to count a cumulative fault time, as indicated at 1406, in response to $P_{FTPT}$ rising above a pressure threshold 1403. Thus, as illustrated, between test time $t_2$ and $t_3$, and again between $t_4$ and $t_5$, in response to $P_{FTPT}$ being greater than pressure threshold 1403, a cumulative fault time on the fault timer may be incremented. As such, between $t_3$ and $t_4$, when $P_{FTPT}$ is below the pressure threshold, the fault timer is not incremented. At $t_5$, in response to the cumulative fault time exceeding a fault time threshold 1405, a check valve fault may be concluded and indicated at 1408. Furthermore, to prevent further pressure build-up in the fuel vapor recovery system, the canister vent valve may be closed at $t_5$. In the depicted example, the diagnostic routine enables a check valve degradation to be identified before the end of the test time. In this way, using a map such as the map of FIG. 14, the diagnostic routine of FIG. 10 may be configured to identify canister check valve degradation and related improper flow of vapors through the fuel vapor recovery system, and address the degradation in an expedited manner.

Figure 11:
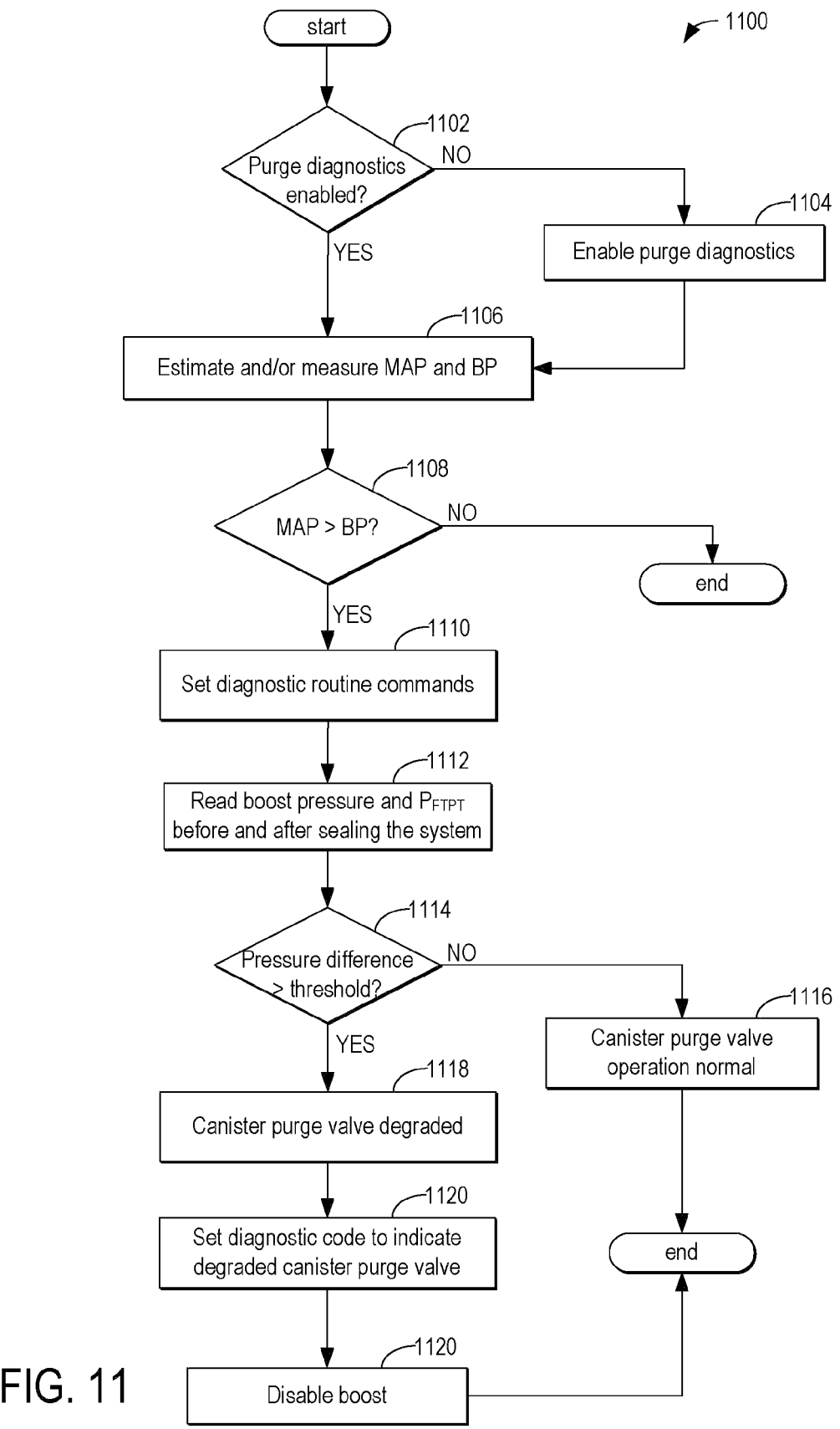

Now turning to FIG. 11, an example diagnostic routine 1100 for identifying reverse flow due to degradation in a canister purge valve is described. As such, diagnostic routine 1100 may be advantageously used in an embodiment of the fuel vapor recovery system wherein a check valve is not included, such as the embodiment of FIG. 4. However, the routine may also be used in alternate embodiments wherein the canister check valve is present. By identifying degradation in the canister purge valve, for example identifying that the canister purge valve is stuck open when it should be closed, detection of reverse air flow (from the intake manifold to the canister and fuel tank) may be expedited. In the case of canister purge valve degradation during a boosted engine operation, improper flow of higher pressure air from the intake manifold can cause the canister and fuel tank to exceed design limits of pressure, while also causing undesirably high fuel vapor emissions into the atmosphere.

At 1102, it is determined whether a purge diagnostics mode has been enabled or not. If purge diagnostics have not been enabled at 1102, then at 1104, it is enabled. At 1106, MAP and BP may be measured and/or estimated. At 1108, it may be determined whether the MAP is greater than the BP, that is, if a boosted condition is present. As such, the difference between the estimated MAP and the estimated BP may represent a boost pressure. If no boost is present, then the routine may end. Once a boosted condition has been established, at 1110, the settings for the diagnostic routine may be commanded. This may include commanding the canister vent valve (CVV) to be closed, by accordingly adjusting the state of the canister vent solenoid. By commanding the canister vent valve to be closed, the fuel vapor recovery system may be sealed from the atmosphere. However, in alternate embodiments, CVV may remain open. Additionally, the canister purge valve may be commanded to be closed, by accordingly adjusting the state of the canister purge valve solenoid. By commanding the canister purge valve to be closed, the fuel vapor recovery system may be sealed from the intake. Further still, the tank isolation valve (TIV) of the fuel vapor recovery system may be commanded to be closed. However, in alternate embodiments, the tank isolation valve may remain open. Since the diagnostic routine is based on a pressure measurement of the FTPT, by commanding the tank isolation valve and the canister vent valve to be closed, during a reverse flow, the detectable pressure difference may be observed relatively faster, for example within a few seconds of sealing the system. Additionally, by concurrently closing the tank isolation valve along with the canister vent valve, the risk of inflating the liquids in the fuel tank may be reduced.

At 1112, the fuel vapor recovery system pressure, as indicated by the FTPT pressure value ($P_{FTPT}$), may be read before and after sealing the system to the intake. That is, a change in pressure at least before and after CPV closure may be determined. At 1114, it may be determined whether the estimated pressure difference is greater than a threshold. As such, the threshold may be an absolute pressure value or a pressure range. If the estimated pressure difference is not above the threshold, then at 1116, normal canister purge valve operation and a proper flow of air and/or vapors through the fuel vapor recovery system may be concluded. If the estimated pressure difference is greater than the threshold, then at 1118, it may be concluded that the canister purge valve has degraded, for example, it may be determined that the purge valve is stuck open, and that a reverse flow of air and/or vapors through the fuel vapor recovery system in under way. Accordingly a diagnostic code may be set at 1120 to indicate the canister purge valve degradation. Additionally, boost may be disabled at 1122. While the depicted example uses a pressure difference to diagnose canister purge valve degradation, as previously elaborated, it will be appreciated that in alternate embodiments, a rate of pressure change or an absolute pressure, or an alternate pressure value may be used to diagnose the degradation.

Figure 12:
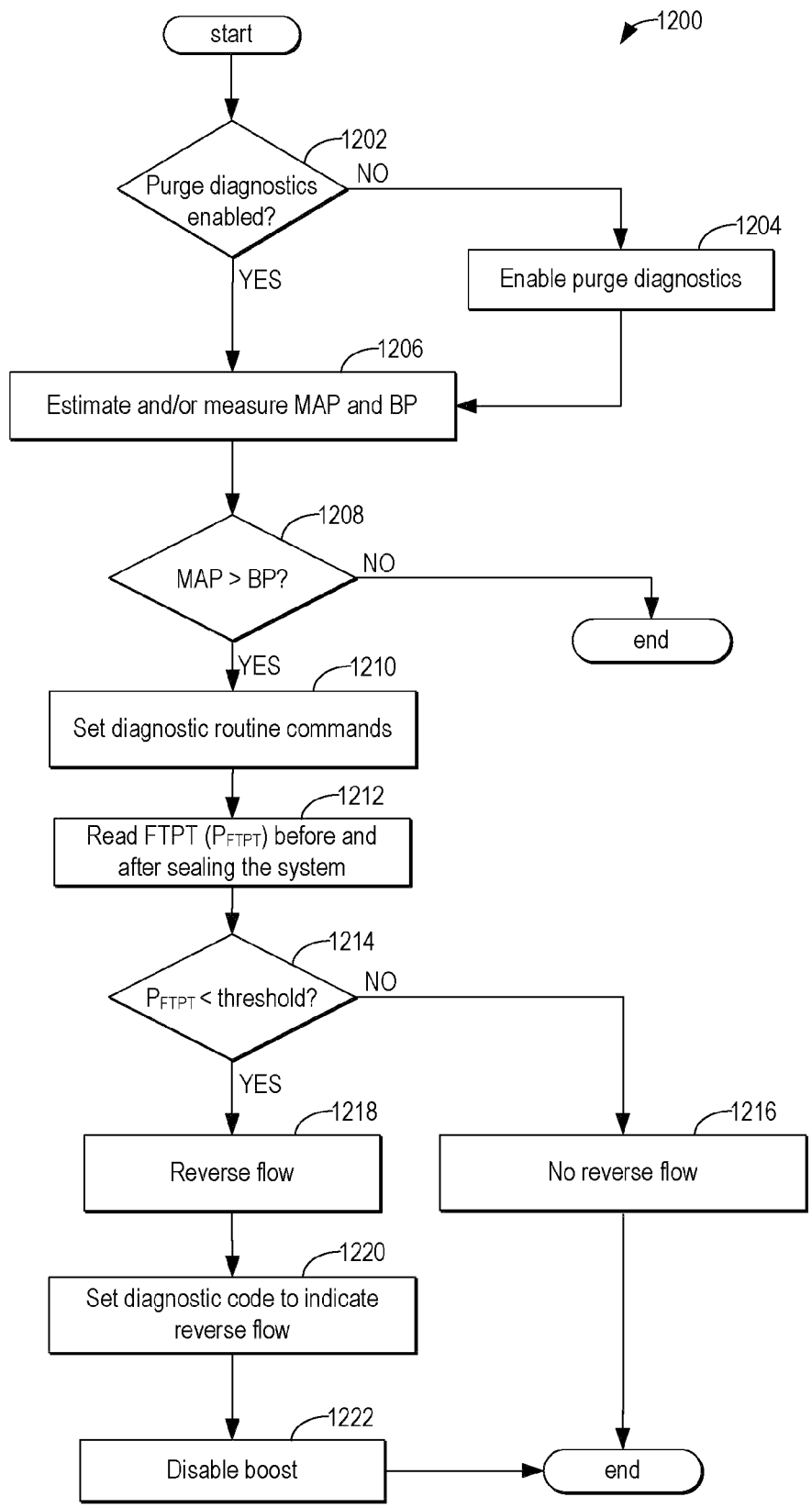

Now turning to FIG. 12, an example diagnostic routine 1200 is described for identifying reverse flow through a fuel vapor recovery system in embodiments of wherein the FTPT is attached to the mouth of a venturi.

At 1202, it is determined whether a purge diagnostics mode has been enabled or not. If purge diagnostics have not been enabled at 1202, then at 1204, it is enabled. At 1206, MAP and BP may be measured and/or estimated. At 1208, it may be determined whether the MAP is greater than the BP, that is, if a boosted condition is present. If no boost is present, then the routine may end. Once a boosted condition has been established, at 1210, the settings for the diagnostic routine may be commanded. This may include commanding the canister purge valve (CPV) to be closed, by accordingly adjusting the state of the canister purge valve solenoid. By commanding the canister purge valve to be closed, the fuel vapor recovery system may be sealed from the engine intake. This may further include commanding the canister vent valve to be closed, by accordingly adjusting the state of the canister vent solenoid. By commanding the canister vent valve (CVV) to be closed, the fuel vapor recovery system may be sealed from the atmosphere. However, in alternate embodiments, the canister vent valve may remain open. As such, since the diagnostic routine is based on a pressure measurement of the FTPT, by commanding the canister vent valve to be closed, a relatively larger pressure difference may be observed. Commanding the settings for the diagnostic routine may further include commanding an optional tank isolation valve (TIV) of the fuel vapor recovery system to be closed. However, in alternate embodiments, the tank isolation valve may remain open. Since the diagnostic routine is based on a pressure measurement of the FTPT, by commanding the tank isolation valve to be closed, during a reverse flow, the detectable pressure difference may be observed relatively faster, for example within a few seconds of sealing the system.

At 1212, the fuel vapor recovery system pressure, as indicated by the FTPT pressure value ($P_{FTPT}$), may be read before and after sealing the fuel vapor recovery system, at least from the engine intake. At 1214, it may be determined whether the pressure difference between the first pressure value ($P_{FTPT}$ before sealing the system) and the second pressure value ($P_{FTPT}$ after sealing the system) is lower than a threshold. As such, the threshold may be an absolute pressure value or a pressure range. Furthermore, the threshold may be adjusted responsive to the boost pressure. If the pressure difference is below the threshold, then it is confirmed that there is a pressure drop across the venturi. As such, during a flow of vapors across a venturi, a significant pressure drop may be expected. While the direction of flow may not be indicated by the venturi, given the prevalent conditions of engine boost, a pressure drop across the venturi may be correlated to reverse flow across the venturi. Thus, if a pressure drop is observed at 1214, at 1218, a reverse flow and degradation of the system may be concluded. Accordingly a diagnostic code may be set at 1220 to indicate the improper flow. Additionally, boost may be disabled at 1222. If the pressure difference is not below the threshold at 1214, for example, if there is no substantial pressure difference and the pressure across the venturi remains static, then at 1216, no reverse flow and degradation of the system may be concluded. In an alternate embodiment, the controller may monitor $P_{FTPT}$ for a predetermined amount of time (as set on a test timer, for example) with the system sealed. If the pressure difference between a first pressure value recorded at the start of the timer and a second pressure value recorded at the stopping of the timer is below the threshold, reverse flow may be concluded. In contrast, if there is no significant pressure difference and there is an indication of static pressure for the duration of the timer, no reverse flow may be concluded. In this way, degradation may be indicated based on the presence of a flow through the fuel vapor recovery system, during boost, when the system is sealed from the intake.

Now turning to FIG. 15, another example diagnostic routine 1500 for identifying reverse flow due to degradation in a canister check valve is described. In contrast to the routine of FIG. 10, wherein the pressure sensitivity of the FTPT is used to diagnose check valve degradation, the routine of FIG. 15 takes advantage of the flow sensitivity of the FTPT. By identifying degradation in the canister check valve, for example identifying that the check valve is stuck open when it should be closed, reverse air flow (from the intake manifold to the canister and fuel tank) detection may be expedited. In the case of canister check valve degradation during a boosted engine operation, improper flow of higher pressure air from the intake manifold can cause the canister and fuel tank to exceed design limits of pressure, while also causing undesirably high fuel vapor emissions into the atmosphere. As such, diagnostic routine 1500 may be used in embodiments of the fuel vapor recovery system wherein a canister check valve is included.

At 1502, it is determined whether a purge diagnostics mode has been enabled or not. If purge diagnostics have not been enabled at 1502, then at 1504, it is enabled. At 1506, MAP and BP may be measured and/or estimated. At 1508, it may be determined whether the MAP is greater than the BP, that is, if a boosted condition is present. As such, the difference between the estimated MAP and the estimated BP may represent a boost pressure. If no boost is present, then the routine may end. Once a boosted condition has been established, at 1510, the settings for the diagnostic routine may be commanded. This may include commanding the canister vent valve (CVV) to be opened, by accordingly adjusting the state of the canister vent solenoid. By commanding the canister vent valve to be opened, the downstream pressure may be known while the upstream pressure is read by the FTPT. Additionally, the canister purge valve (CPV) may be commanded to be opened, or partially opened, by accordingly adjusting the state of the canister purge valve solenoid. In one example, during an "active diagnostics" mode, the CPV may be actively commanded to be opened, under boosted engine conditions, to verify check valve operation. In doing so, the controller may actively ensure that under conditions of boost, and even under conditions of a degraded CPV (that is, an open CPV), the check valve is operational and is able to prevent boosted air flow from entering the fuel vapor recovery system. Further still, the tank isolation valve (TIV) of the fuel vapor recovery system may be commanded to be closed. However, in alternate embodiments, the tank isolation valve may remain open.

It will be appreciated that the flow sensitivity of the FTPT may be used to identify check valve degradation irrespective of whether the FTPT is coupled upstream of an orifice or coupled to the mouth of a venturi. Furthermore, the FTPT (and orifice or venturi) may be positioned either in vent 27 or along purge line 28. In one example, when the FTPT is positioned in vent 27, at 1512, a pressure upstream of the orifice or venturi, as indicated by the FTPT pressure value ($P_{FTPT}$), and a pressure downstream of the orifice or venturi, as indicated by the atmospheric pressure (BP) may be read. In another example, when the FTPT is positioned in purge line 28, at 1512, a pressure upstream of the orifice or venturi, as indicated by the FTPT pressure value ($P_{FTPT}$), and a pressure downstream of the orifice or venturi, as indicated by the manifold pressure (MAP) may be read. At 1514, it may be determined whether the pressure difference between the upstream estimated pressure and the downstream estimated pressure is greater than a threshold. As such, the threshold may be an absolute pressure value or a pressure range. If the estimated pressure difference is not above the threshold, then at 1516, normal canister check valve operation and no irregular flow of air and/or vapors through the fuel vapor recovery system may be concluded. If the estimated pressure is greater than the threshold, then at 1518, it may be concluded that a flow of vapors across the orifice or venturi has occurred, and that the canister check valve has degraded. Accordingly a diagnostic code may be set at 1520 to indicate the canister check valve degradation. Additionally, boost may be disabled at 1522.

Now turning to FIG. 16, a similar flow-sensitive diagnostic routine 1600 for identifying reverse flow due to degradation in a canister purge valve is described. In contrast to the routine of FIG. 11, wherein the pressure sensitivity of the FTPT was used to diagnose check valve degradation, the routine of FIG. 16 takes advantage of the flow sensitivity of the FTPT. By identifying degradation in the canister purge valve, for example identifying that the check purge is stuck open when it should be closed, reverse air flow (from the intake manifold to the canister and fuel tank) detection may be expedited. Diagnostic routine 1600 may be advantageously used in embodiments of the fuel vapor recovery system wherein a canister check valve is not included.

At 1602, it is determined whether a purge diagnostics mode has been enabled or not. If purge diagnostics have not been enabled at 1602, then at 1604, it is enabled. At 1606, MAP and BP may be measured and/or estimated. At 1608, it may be determined whether the MAP is greater than the BP, that is, if a boosted condition is present. As such, the difference between the estimated MAP and the estimated BP may represent a boost pressure. If no boost is present, then the routine may end. Once a boosted condition has been established, at 1610, the settings for the diagnostic routine may be commanded. This may include commanding the canister vent valve (CVV) to be opened, by accordingly adjusting the state of the canister vent solenoid. By commanding the canister vent valve to be opened, the downstream pressure may be known while the upstream pressure is read by the FTPT. Additionally, the canister purge valve (CPV) may be commanded to be closed, by accordingly adjusting the state of the canister purge valve solenoid. Further still, the tank isolation valve (TIV) of the fuel vapor recovery system may be commanded to be closed. However, in alternate embodiments, the tank isolation valve may remain open.

In one example, when the FTPT is positioned in vent 27, at 1612, a pressure upstream of the orifice or venturi, as indicated by the FTPT pressure value ($P_{FTPT}$), and a pressure downstream of the orifice or venturi, as indicated by the atmospheric pressure (BP) may be read. In another example, when the FTPT is positioned in purge line 28, at 1612, a pressure upstream of the orifice or venturi, as indicated by the FTPT pressure value ($P_{FTPT}$), and a pressure downstream of the orifice or venturi, as indicated by the manifold pressure (MAP) may be read. At 1614, it may be determined whether the pressure difference between the upstream estimated pressure and the downstream estimated pressure is greater than a threshold. As such, the threshold may be an absolute pressure value or a pressure range. If the estimated pressure difference is not above the threshold, then at 1616, normal canister purge valve operation and no irregular flow of air and/or vapors through the fuel vapor recovery system may be concluded. If the estimated pressure is greater than the threshold, then at 1618, it may be concluded that a flow of vapors across the orifice or venturi has occurred, and that the canister purge valve has degraded. Accordingly a diagnostic code may be set at 1620 to indicate the canister purge valve degradation. Additionally, boost may be disabled at 1622.

It will be appreciated that in alternate embodiments of the diagnostic routines of FIGS. 7-12, and 15-16, in addition to detecting reverse flow, the controller may be configured to redirect the reverse flow towards the engine's air intake passage using a pressure relief valve, for example a pressure relief valve configured along a conduit starting substantially between the canister purge valve and the check valve and directing flow to the engine's intake passage.

In this way, changes in a pressure or changes in pressure differences across a fuel vapor recovery system, for example as estimated by a fuel tank pressure sensor coupled to the system, can be used to monitor and diagnose reverse flow through the fuel vapor recovery system, in a boosted engine. Additionally, the characteristic pressure changes may be used to identify component degradation, such as canister purge valve and/or canister check valve degradation. By identifying characteristic pressure changes across the sensor responsive to reverse flow conditions, excessive evaporative emissions caused by such improper air flow may be reduced. By using routines and sensors that do not require regular calibration (although in some examples, calibration may be used), the robustness of the detection method can be enhanced. Furthermore, by not necessitating calibration, diagnostic pressure thresholds may be hardcoded into the routines, and improper flow can be more easily detected by the vehicle PCM. By extending use of the fuel tank pressure sensor beyond its function in EONV leak detection, as a flow sensor during both forward and reverse flow, the number of hardware components required for diagnostic purposes may be reduced. Additionally, the flow sensor may be used to diagnose and characterize flow through a canister purge valve during forward flow in addition to predicting potential over-pressure related issues during a reverse flow. By identifying reverse flow during a fuel vapor purging operation, and by further identifying degradation in a canister purge valve or check valve, over-pressure related component damage and the percentage of evaporative emissions in a boosted engine exhaust may be significantly reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and nonobvious combinations and subcombinations of the various systems and configurations, and other features, functions, and/or properties disclosed herein.

The invention claimed is:

1. A method for a vehicle fuel vapor system coupled to an engine intake, comprising:
   during boosted conditions, intermittently adjusting a restriction in the fuel vapor system, the restriction downstream of a valve; and
   indicating degradation, including reverse flow of gases from the engine intake to the fuel vapor system, based on one or more of a change in a pressure or flow value in the fuel vapor system that correlates to the intermittent adjusting.

2. The method of claim 1 wherein the pressure value includes at least one of a fuel vapor system pressure, an engine intake manifold pressure, a rate of change of the pressure value, or a pressure difference between a first pressure value estimated before adjusting the restriction and a second pressure value estimated after adjusting the restriction.

3. The method of claim 2 wherein the fuel vapor system pressure is estimated by a fuel tank pressure transducer coupled between a fuel tank and the engine intake, and wherein the manifold pressure is estimated by a manifold pressure sensor coupled to the engine intake.

4. The method of claim 2 wherein indicating degradation based on a change in pressure value includes indicating degradation when the change in pressure value is greater than a threshold and setting a diagnostic code.

5. The method of claim 4 further comprising, disabling boost responsive to the indication of degradation, the disabling of boost including disabling operation of a boosting device coupled in the engine intake.

6. The method of claim 3 wherein the fuel tank pressure transducer is coupled to a venturi, and wherein indicating degradation based on a change in flow includes indicating degradation based on the presence of a flow across the venturi.

7. The method of claim 6 wherein indicating degradation based on the presence of the flow across the venturi includes indicating degradation based on a pressure difference across the venturi being greater than a threshold.

8. The method of claim 1 wherein intermittently adjusting a restriction includes intermittently sealing the fuel vapor system from the atmosphere by intermittently commanding a canister vent valve to be closed.

9. The method of claim 1 wherein intermittently adjusting a restriction includes intermittently sealing the fuel vapor system from the intake by intermittently commanding a canister purge valve to be closed.

10. A system, comprising:
an engine comprising an intake;
a boosting device with a compressor configured to provide a boost to the engine intake;
a fuel vapor system coupled to the engine intake, said fuel vapor system including a fuel tank pressure transducer, a fuel vapor canister, a canister purge valve, a check valve and a canister vent valve; and
a control system configured to,
intermittently adjust a restriction in the fuel vapor system during a boosted condition; and
indicate degradation, including reverse flow of gases from the engine intake to the fuel vapor system, based on at least one of a change in pressure or flow value in the fuel vapor system that correlates to the intermittent adjusting.

11. The system of claim 10 wherein intermittently adjusting a restriction includes intermittently sealing the fuel vapor system from the atmosphere by intermittently commanding the canister vent valve to be closed.

12. The system of claim 11 further comprising a tank isolation valve, wherein intermittently adjusting a restriction further includes intermittently commanding the tank isolation valve to be closed.

13. The system of claim 12 wherein a fuel tank pressure sensor is positioned between the tank isolation valve and the fuel tank.

14. The system of claim 11 wherein the pressure value includes at least one of a fuel vapor system pressure estimated by the fuel tank pressure transducer, a manifold pressure estimated by a manifold pressure sensor, a rate of change of the pressure value, and a pressure difference between a first pressure value estimated before adjusting the restriction and a second pressure value estimated after adjusting the restriction.

15. The system of claim 14 wherein indicating degradation based on the change in pressure value includes indicating degradation when the change in pressure value is greater than a threshold, a controller further configured to set a diagnostic code and disable boost responsive to the indication of degradation, the disabling of boost including disabling operation of a boosting device coupled in the engine intake.

16. The system of claim 11 wherein the fuel tank pressure transducer is coupled to a venturi, and wherein indicating degradation based on the change in flow value includes indicating degradation based on the presence of a flow across the venturi.

17. The system of claim 16 wherein indicating degradation further includes indication degradation of the check valve.

18. A method of monitoring reverse flow of fuel vapors and/or air through a vehicle fuel vapor system including a fuel tank pressure transducer, a fuel vapor canister, a canister purge valve, and a canister vent valve, a fuel tank pressure sensor positioned between the fuel vapor canister and a fuel tank, said fuel vapor system coupled to an engine intake of a boosted internal combustion engine, the method comprising:
intermittently adjusting a restriction in the fuel vapor recovery system during boost, and indicating degradation, including reverse flow of fuel vapors and/or air through the vehicle fuel vapor system, based on at least one of a change in a pressure or flow value in the fuel vapor system that correlates to the intermittent adjusting.

19. The method of claim 18 wherein intermittently adjusting a restriction includes commanding the fuel vapor system to be sealed from the engine intake by commanding the canister purge valve to be closed, and intermittently sealing the fuel vapor system from the atmosphere by intermittently commanding the canister vent valve to be closed.

20. The method of claim 19 wherein the fuel vapor system further includes a tank isolation valve, and wherein intermittently adjusting a restriction further includes intermittently commanding the tank isolation valve to be closed.

21. The method of claim 20 wherein the pressure value includes at least one of a fuel vapor recovery system pressure estimated by the fuel tank pressure transducer, a manifold pressure estimated by a manifold pressure sensor, a rate of change of the pressure value, and a pressure difference between a first pressure value estimated before adjusting the restriction and a second pressure value estimated after adjusting the restriction.

* * * * *